(12) United States Patent
Katori

(10) Patent No.: US 9,160,656 B2
(45) Date of Patent: Oct. 13, 2015

(54) BASE STATION APPARATUS

(71) Applicant: FUJITSU LIMITED, Kawasaki-shi, Kanagawa (JP)

(72) Inventor: Masato Katori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 14/064,445

(22) Filed: Oct. 28, 2013

(65) Prior Publication Data

US 2014/0169264 A1    Jun. 19, 2014

(30) Foreign Application Priority Data

Dec. 19, 2012  (JP) ................................. 2012-276939

(51) Int. Cl.
*H04J 3/08* (2006.01)
*H04L 12/741* (2013.01)
*H04W 16/26* (2009.01)

(52) U.S. Cl.
CPC .............. *H04L 45/54* (2013.01); *H04W 16/26* (2013.01)

(58) Field of Classification Search
CPC ............................ H04W 16/26; H04L 12/741
USPC ........................................................ 370/315
See application file for complete search history.

(56) References Cited

U.S. PATENT DOCUMENTS

| 2007/0177552 | A1 | 8/2007 | Wu et al. |
| 2009/0252108 | A1 | 10/2009 | Watanabe |
| 2011/0078326 | A1* | 3/2011 | Horibuchi ..................... 709/232 |
| 2011/0158332 | A1 | 6/2011 | Wu et al. |
| 2011/0171902 | A1 | 7/2011 | Toyoda et al. |
| 2012/0307713 | A1 | 12/2012 | Watanabe et al. |

FOREIGN PATENT DOCUMENTS

| JP | 2007-529926 | 10/2007 |
| JP | 2011-130179 | 6/2011 |
| JP | 2011-171961 | 9/2011 |
| WO | 2008/114351 | 9/2008 |
| WO | 2010/044142 | 4/2010 |

* cited by examiner

*Primary Examiner* — Sai-Ming Chan
(74) *Attorney, Agent, or Firm* — Fujitsu Patent Center

(57) ABSTRACT

A base station apparatus includes a plurality of wireless control devices, each of which transmits data blocks addressed to a wireless device connected to the wireless control device, a plurality of wireless devices, each of which transmits data blocks addressed to a wireless control device connected to the wireless device; and relay devices arranged between the wireless control devices and the wireless devices. Each relay device includes a plurality of transmission ports, a table to store a correspondence between destinations of received data blocks and transmission ports for transmitting the reception data blocks, a sorting unit to sort received data blocks to one of the plurality of transmission ports corresponding to destinations of the received data blocks, and a controller to control rewriting of the table for changing the correspondence.

8 Claims, 24 Drawing Sheets

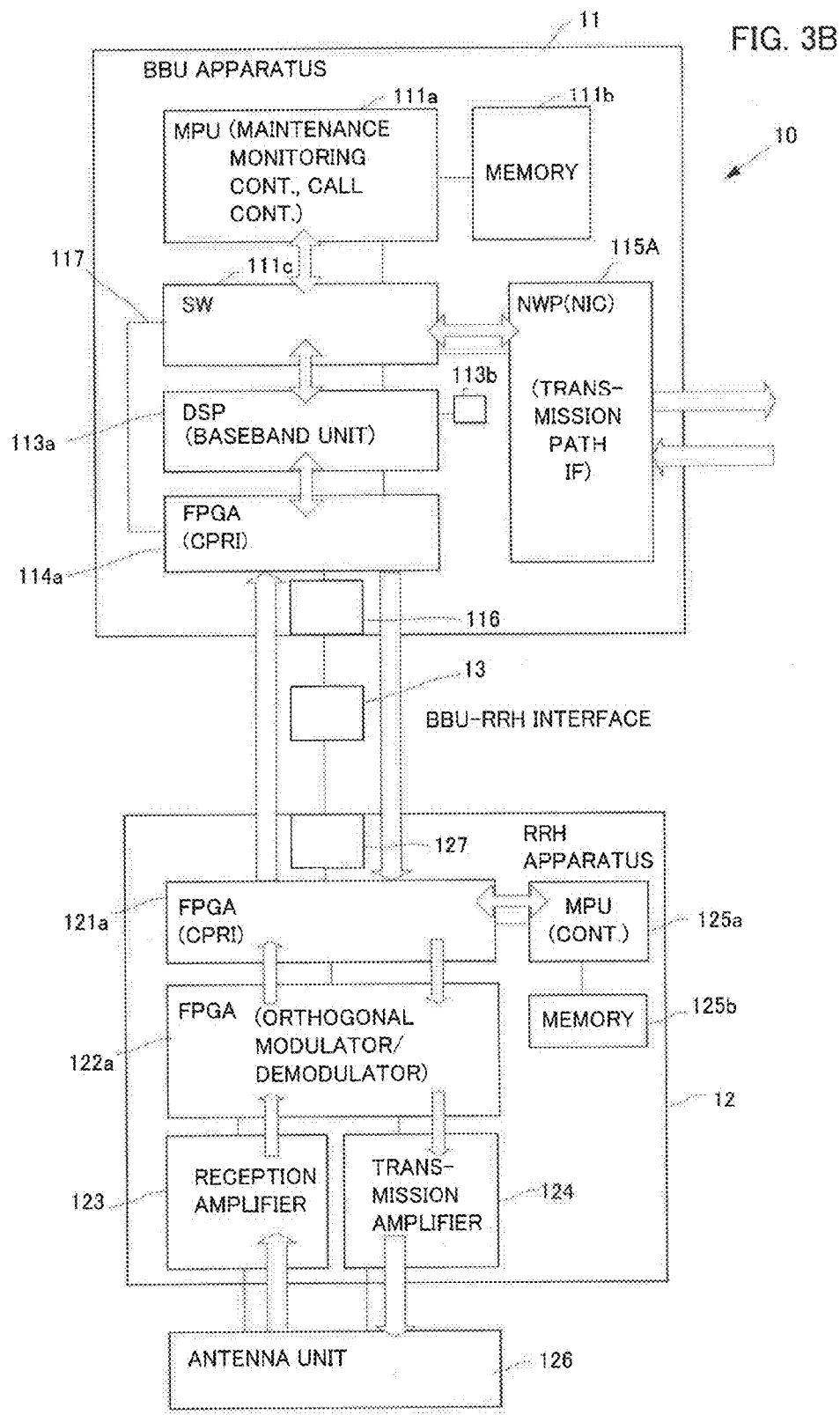

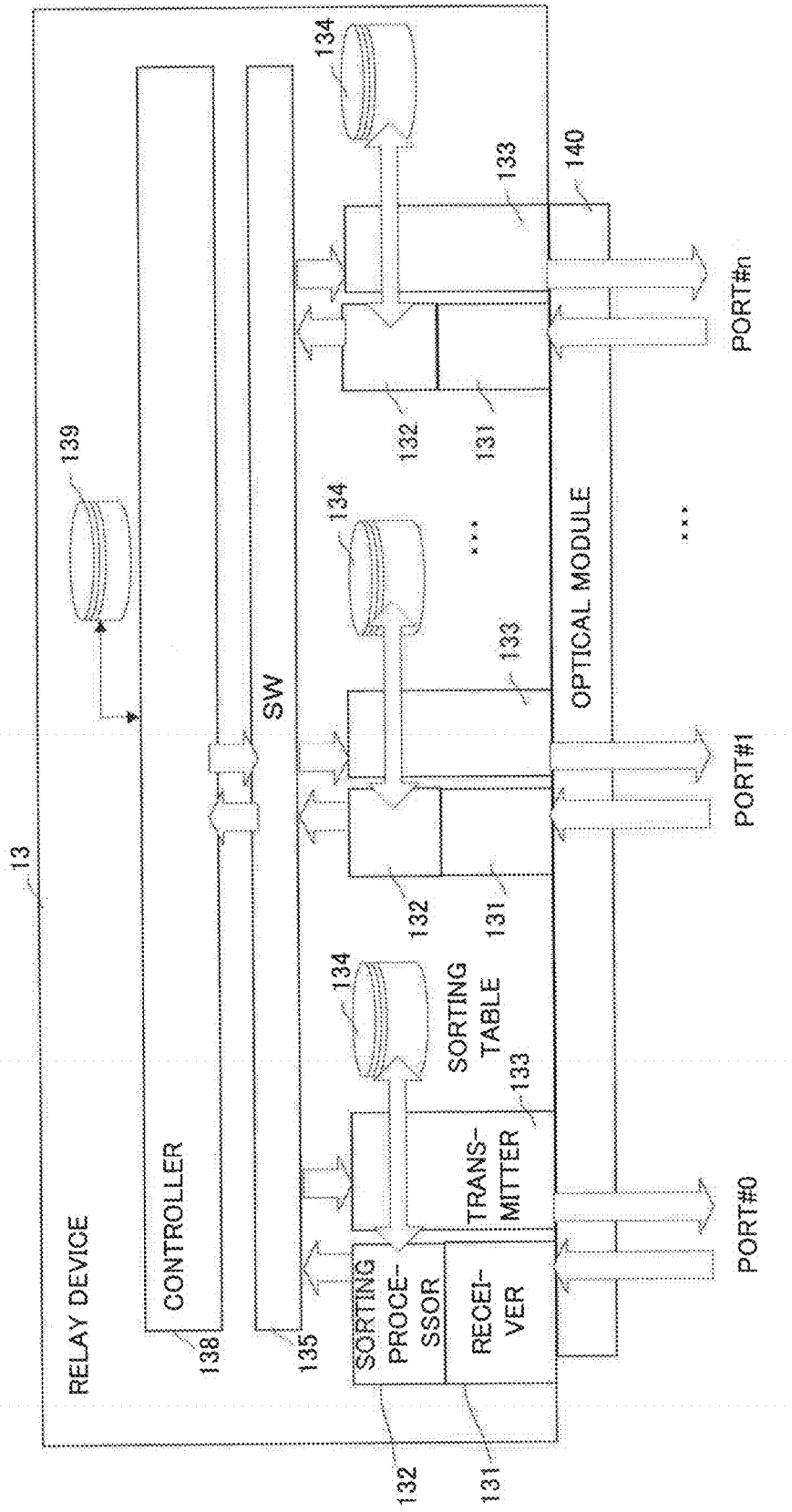

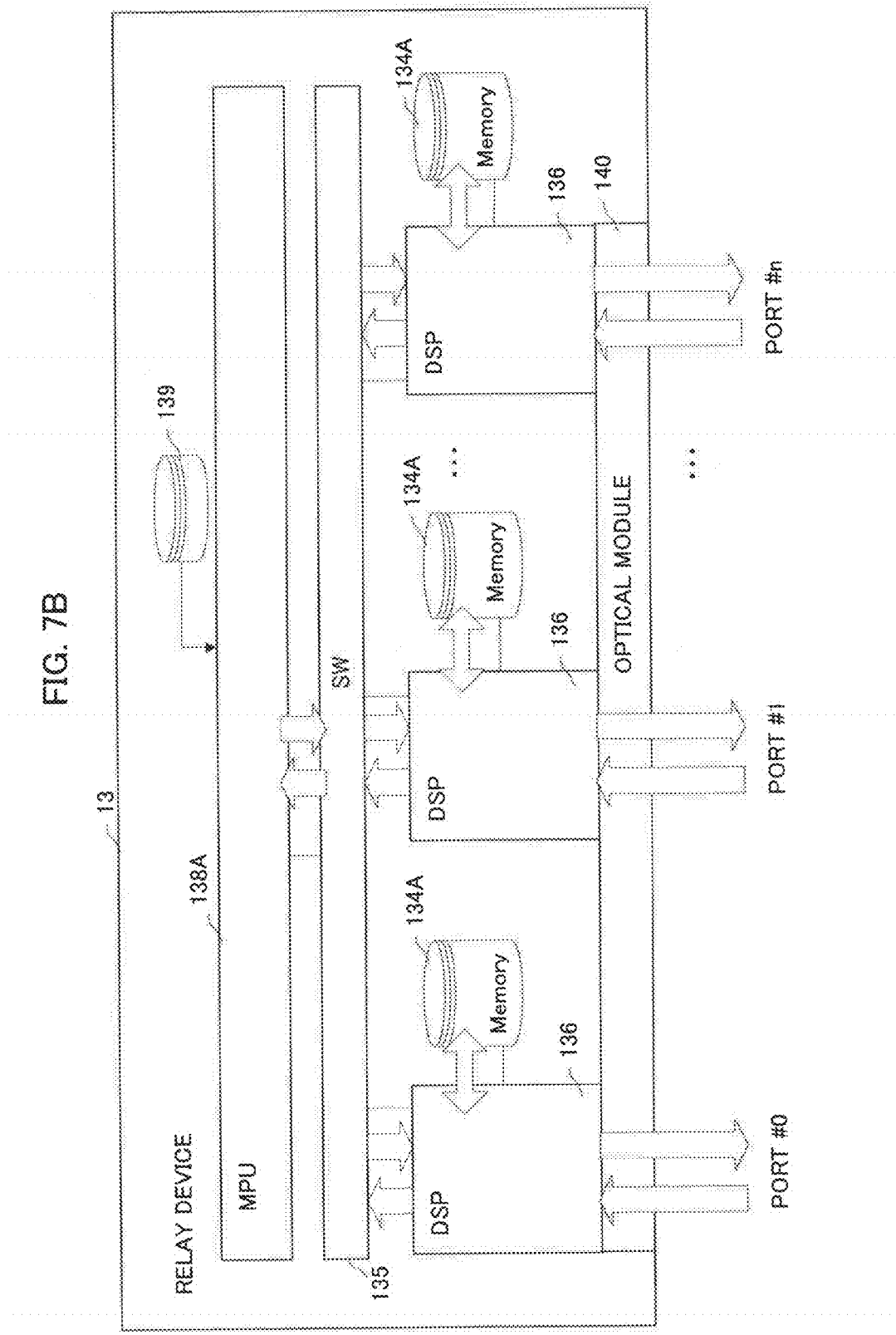

FIG. 8

| DESTINATION ID | TRANS-MISSION PORT | PRIORITY | STATE |
|---|---|---|---|
| 001001 | Port#1 | 1 | NORMAL |
| 001002 | Port#3 | 1 | FAILURE |
| 001002 | Port#2 | 2 | NORMAL |
| 001003 | Port#3 | 1 | FAILURE |
| 001003 | Port#4 | 2 | NORMAL |
| 001004 | Port#5 | 1 | NORMAL |
| 001005 | Port#5 | 1 | NORMAL |
| 001006 | Port#1 | 1 | NORMAL |

FIG. 11A

RELAY DEVICE #2 P2

| DEST. ID | T-PORT | PRIORITY | STATE |
|---|---|---|---|
| BBU#1 | P3 | 1 | NORMAL |
| BBU#2 | P3 | 1 | NORMAL |
| BBU#3 | P4 | 1 | NORMAL |
| BBU#4 | P4 | 1 | NORMAL |

FIG. 11B

RELAY DEVICE #4 P2

| DEST. ID | T-PORT | PRIORITY | STATE |
|---|---|---|---|
| BBU#3 | P3 | 1 | NORMAL |
| BBU#4 | P4 | 1 | NORMAL |

| DEST. ID | SOURCE ID | R-PORT NUMBER | T-PORT NUMBER | PRIORITY | STATE | THE NUMER OF FREE SLOTS |
|---|---|---|---|---|---|---|
| X1 | Y1 | A1 | B1 | 1 | NORMAL | 2 |
| X2 | Y2 | A2 | B2 | 1 | NORMAL | 1 |
| X3 | Y3 | A3 | B3 | 1 | NORMAL | 0 |

...

BASE STATION APPARATUS

CROSS-REFERENCE TO RELATED APPLICATION

This application is based upon and claims the benefit of priority of the prior Japanese Patent Application No. 2012-276939, filed on Dec. 19, 2012, the entire contents of which are incorporated herein by reference.

FIELD

Disclosure relates to a base station apparatus.

BACKGROUND

In recent years, a wireless communication system including a portable phone system is a significantly meaningful social infrastructure, and effect of stopping the operation of a service due to a failure is not small. Therefore, continuity and stability of services are taken into account in the development of the wireless communication system. The amount of data communication in portable phone services is increasing due to advanced functions of wireless terminals as well as diversification and sophistication of services in the wireless communication system.

One of the standards in a wireless communication method specified by 3GPP (3rd Generation Partnership Project) includes LTE (Long Term Evolution) released as 3GPP Release.8. In the LTE, a base station apparatus (called "eNode B") is divided into a wireless unit and a control/baseband unit (also called "wireless control unit" or "baseband unit") due to indoor installation, and the wireless unit and the control/baseband unit are connected by a communication interface. In the LTE, the wireless unit is called an RRH (Radio Remote Head), and the control/baseband processing unit is called a BBU (Base Band Unit). The BBU is also called "Radio Equipment Control (REC)" in some cases, and the RRH is also called "Radio Equipment (RE)" in some cases.

The BBU and the RRH are usually connected by CPRI (Common Public Radio Interface). The CPRI is one of BBU-RRH interfaces. When the CPRI is applied, a CPRI signal including a baseband signal (IQ data) and a maintenance monitoring signal is transmitted and received between the BBU and the RRH according to a CPRI protocol. In general, the RRH can be installed at a location several km away from the BBU through connection via an optical line (optical fiber) for transmitting and receiving the CPRI signal.

For more information, see National Publication of International Patent Application No. 2007-529926, Japanese Patent Laid-Open No. 2011-171961, International Publication No. WO2008/114351, International Publication No. 2010/044142, and Japanese Patent Laid-Open No. 2011-130179.

Usually, a plurality of RRHs are connected to one BBU, and a plurality of cells or sectors are operated. When the CPRI is used to connect the BBU and the RRHs, a layer 2 and higher layers are terminated between the BBU and the RRHs in the CPRI protocol for connecting the BBU and the RRHs. Therefore, when the connection relationship between the BBU and the RRHs is changed, the setting or physical connection of all paths between the BBU and the RRHs is changed.

SUMMARY

An embodiment of the invention is a base station apparatus, including:

a plurality of wireless control devices, each of which transmits data blocks addressed to a wireless device connected to the wireless control device itself;

a plurality of wireless devices, each of which transmits data blocks addressed to a wireless control device connected to the wireless device itself; and one or two or more relay devices arranged between the plurality of wireless control devices and the plurality of wireless devices, each relay device including:

a plurality of transmission ports;

a table to store a correspondence between destinations of received data blocks and transmission ports for transmitting the reception data blocks;

a sorting unit to sort received data blocks to one of the plurality of transmission ports corresponding to destinations of the received data blocks based on the correspondence; and a controller to control rewriting of the table for changing the correspondence.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3B illustrates an example of a hardware block configuration of the BBU and the RRH illustrated in FIG. 3A;

FIG. 5 is a diagram for describing functions of a layer 2b and a layer 2a;

FIG. 7A illustrates an example of a functional block configuration of a relay device;

FIG. 7B illustrates an example of a hardware block configuration of the relay device;

FIG. 8 illustrates an example of a data structure of a sorting table;

FIG. 11A illustrates an example of registration content of the sorting table corresponding to a reception port with a port number "P2" of a relay device #2 illustrated in FIG. 10;

FIG. 11B illustrates an example of registration content of the sorting table corresponding to a reception port with a port number "P2" of a relay device #4 illustrated in FIG. 10;

FIG. 14 illustrates an example of a data configuration of a management table included in the relay device;

DESCRIPTION OF EMBODIMENTS

Hereinafter, an embodiment of the present invention will be described with reference to the drawings. Configurations of the embodiment are illustrative, and the present invention is not limited to the configurations of the embodiment.

In general, a BBU and an RRH included in a base station (eNode B) is connected through an optical interface or an electrical interface compliant with CPRI that is one of the BBU-RRH interfaces. The BBU generates a baseband signal and transmits the baseband signal to the RRH, and the RRH converts the baseband signal to a wireless signal (RF signal) and outputs the wireless signal from an antenna.

Figure 1:
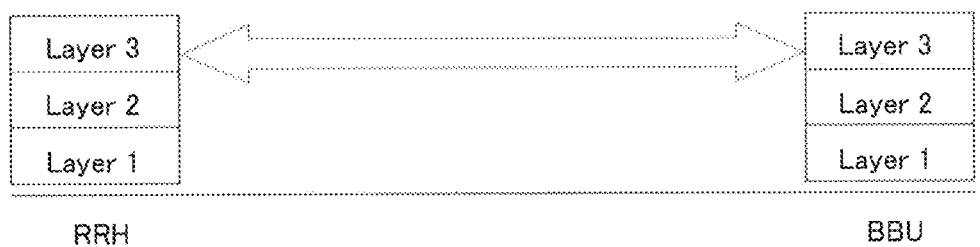
FIG. 1 illustrates a layer configuration of a CPRI protocol.

FIG. 1 illustrates a layer configuration of a CPRI protocol. In FIG. 1, a layer 1 defines a physical transmission path based on an optical signal or an electrical signal. A layer 2 defines a bitmap for allocating data of a user plane (user data: baseband signal) of a layer 3, data (C&M data) of a control management (C&M) plane that is a maintenance monitoring/control signal of a CPRI link, and the like. The layer 3 is an application layer which defines the user plane, a format (C&M plane) of maintenance monitoring and control signal between the BBU and the RRH, and the like.

The layer 2 of the CPRI protocol includes the following structure. More specifically, in the CPRI, data transmitted and received between the BBU and the RRH is transferred in wireless frames called UMTS (Universal Mobile Telecommunications System) frames (also called "CPRI frames"). In the CPRI, the UMTS frame is divided into 150 wireless data (segments) called hyper frames.

The hyper frame is formed by a set of 256 frames at 3.84 MHz called basic frames. The lengths of the basic frame, the hyper frame, and the UMTS frame are about 260 ns, 66.67 µs, and 10 ms, respectively.

The hyper frame includes: an area (IQ data area) for describing (digitally mapping) a baseband signal (user data) as IQ data; and an area (control word area) for describing a control word equivalent to the maintenance monitoring/control signal (C&M data). The control word area includes an area for storing a control command for controlling and monitoring the CPRI protocol, an area for forming a maintenance monitoring channel in the layer 3, and the like.

The control and monitoring of the CPRI protocol have functions for negotiation of the CPRI link and maintenance monitoring control of the layer 1. The hyper frame further includes an area (called "Vender Specific area") that can be freely used by a vendor.

In the CPRI protocol connecting the BBU and the RRH, the layer 2 and higher layers are terminated between the BBU and the RRH. Therefore, a change in the connection relationship between the BBU and the RRH is associated with a change in the setting of the entire path between the BBU and the RRH or a change in the physical connection. As a result, there are the following problems.

(1) The connection relationship between the BBU and the RRH is fixed, and surplus resources of the BBU are not provided to another base station (cell/sector).

(2) Another device is not used to substitute the operation at a failure in the BBU or the RRH.

(3) Operation of setting a plurality of paths between the BBU and the RRH and changing the transmission path of the wireless signal during operation is not performed. For example, a partial section of the path is not switched at a breakdown of a transmission apparatus on the path connecting the BBU and the RRH.

A base station apparatus (base station system) according to the embodiment employs the following configuration to flexibly implement operational change related to the connection between the BBU and the RRH. The flexible implementation of the operational change includes changing the transmission path of data (signal) between the BBU and the RRH during the operation of the system and changing the BBU as the connection point of the RRH.

<Configuration of Base Station Apparatus (Base Station System)>

Figure 2:
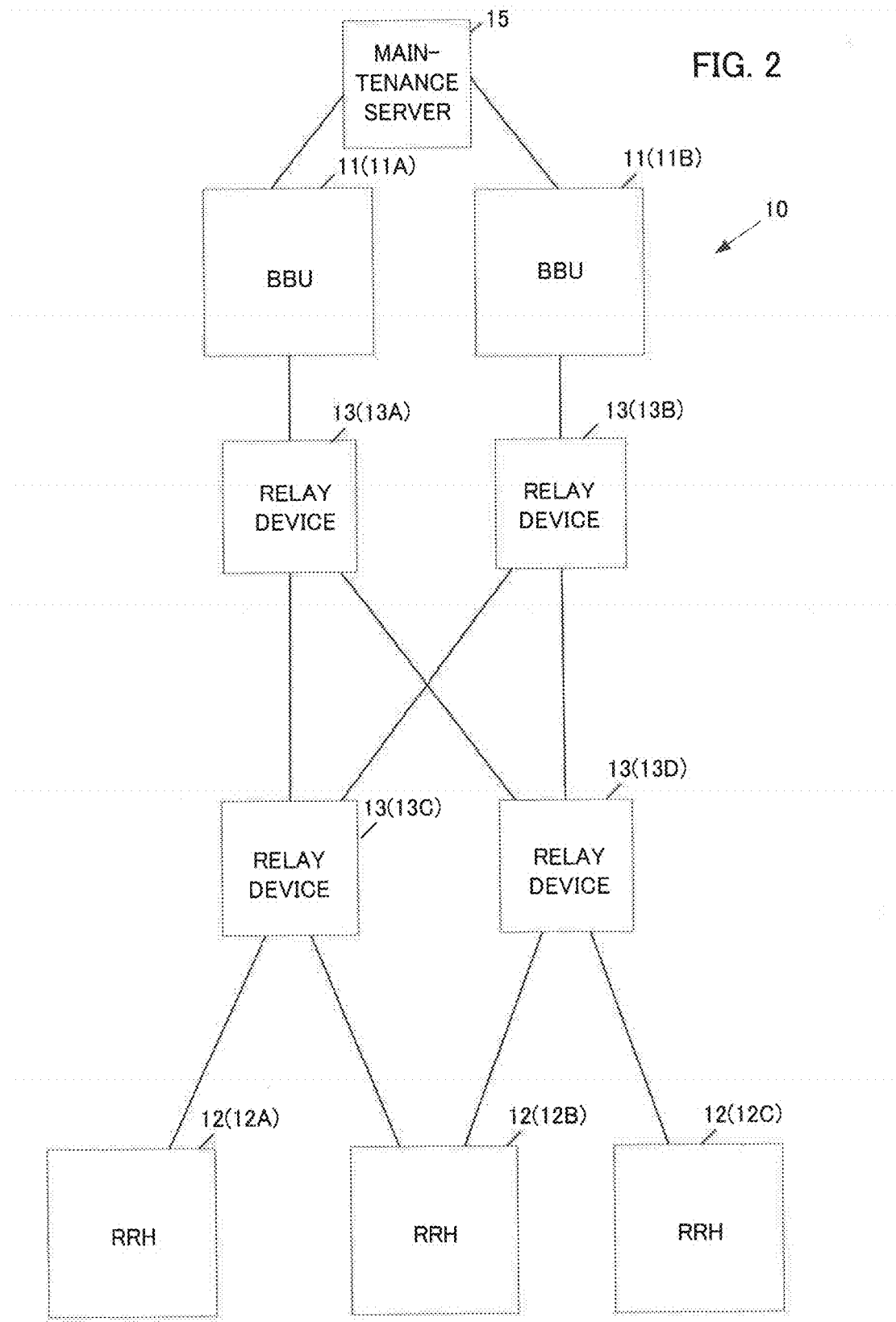
FIG. 2 illustrates an example of an overall configuration of a base station apparatus in an embodiment.

FIG. 2 illustrates an example of an overall configuration of the base station apparatus according to the embodiment. The base station apparatus is applied to a mobile communication system (portable phone (cellular phone) system). Although a mobile communication system compliant with LTE is illustrated as an example of the mobile communication system in the description of the embodiment, mobile communication systems compliant with other communication standards can also be applied.

FIG. 2 illustrates a base station apparatus (base station system) 10 as the base station apparatus according to the embodiment, the base station apparatus 10 including a plurality of BBUs 11, a plurality of RRHs 12, and a plurality of relay devices 13. The BBU 11 is an example of a wireless control device, and the RRH 12 is an example of a wireless device.

In the example illustrated in FIG. 2, two BBUs 11 (11A and 11B) and three RRHs 12 (12A, 12B, and 12C) are connected through four relay devices 13 (13A, 13B, 13C, and 13D).

Physical cables (optical fibers or electrical cables) corresponding to specifications of a BBU-RRH interface connect between the BBU 11 and the relay device 13, between the relay devices 13, and between the relay device 13 and the RRH 12.

In the example illustrated in FIG. 2, the BBU 11A is connected to the relay device 13A, and the BBU 11B is connected to the relay device 13B. The relay devices 13A to 13D are connected to each other. The RRH 12A is connected to the relay device 13C, and the RRH 12B is connected to the relay device 13D. The BBU 11A and the BBU 11B are connected to a maintenance server 15. The maintenance server 15 maintains and manages the BBU 11A and the BBU 11B.

<Configurations of BBU and RRH>
<<Configuration of BBU>>

Figure 3A:
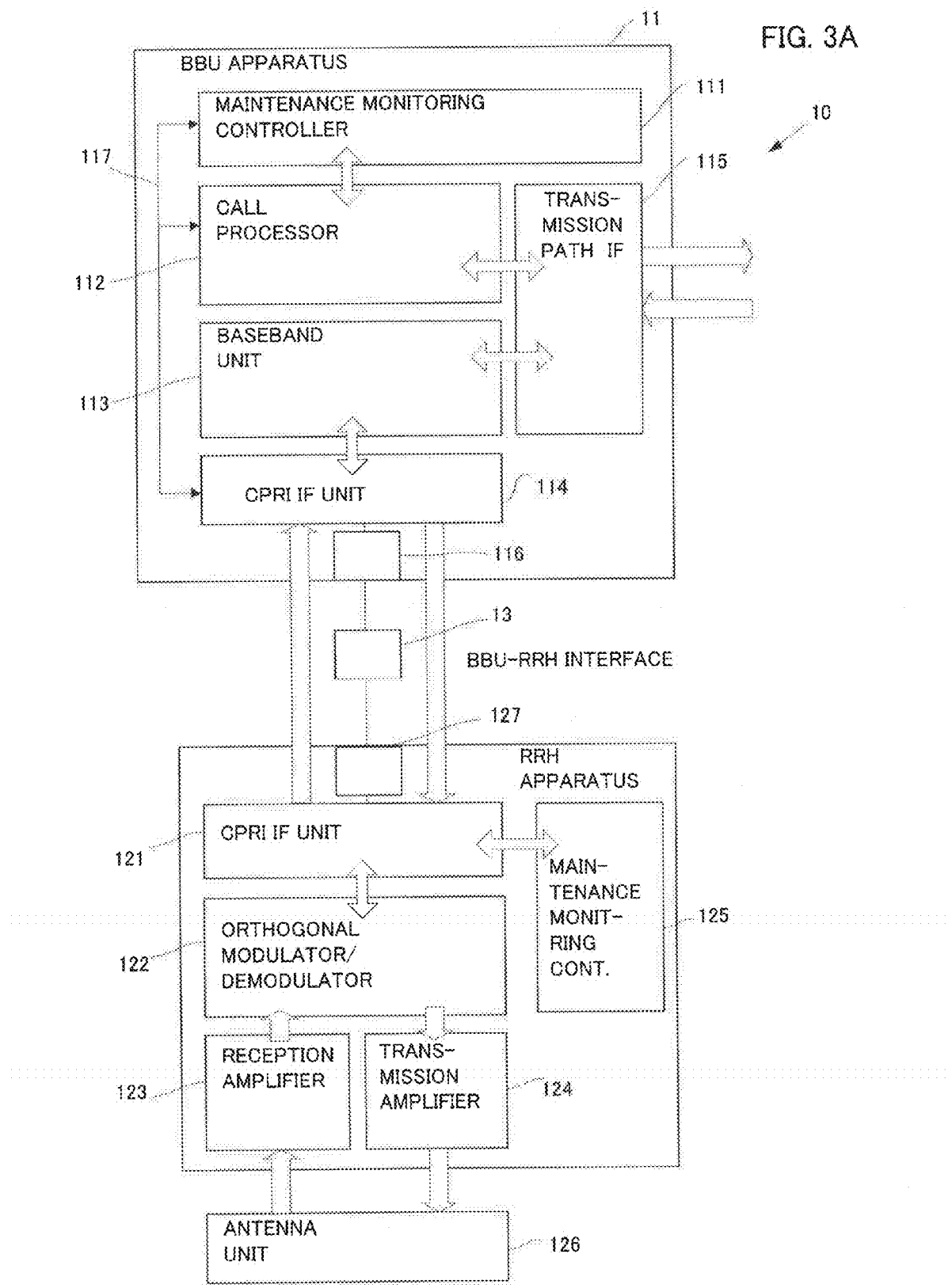
FIG. 3A illustrates an example of a functional block configuration of a BBU (BBU device) and an RRH (RRH device) included in the base station apparatus.

FIG. 3A illustrates an example of functional block configurations of the BBUs 11 (BBUs 11A and 11B) as BBU devices and the RRHs 12 (RRHs 12A, 12B, and 12C) as RRH devices included in the base station apparatus 10, and FIG. 3B illustrates an example of hardware block configurations of the BBUs 11 and the RRHs 12 illustrated in FIG. 3A. However, the relay devices 13 are simply illustrated in FIGS. 3A and 3B. The BBUs 11 and the RRHs 12 according to the embodiment have configurations and functions of general BBUs and RRHs, except for the configuration related to the BBU-RRH interface.

In the example illustrated in FIG. 3A, the BBU 11 includes a maintenance monitoring control unit (a maintenance monitoring controller) 111, a call processing unit (a call processor) 112, a baseband unit 113, a CPRI processing unit 114, a transmission path interface (transmission path IF) 115, and an optical module 116.

The transmission path IF 115 houses a LAN (Local Area Network), such as Ethernet (registered trademark), as a transmission path. On the transmission path, an S1 interface (S1 line) used for connection between the base station apparatus 10 and a higher-level apparatus (MME/UPE (Mobile Management Entity/User Plane Entity): not illustrated) on a core network and an X2 interface (X2 line) used for connection between the base station apparatus 10 and an adjacent base station (not illustrated) are formed. The transmission path IF 115 executes a termination process of the S1 and X2 interfaces. The transmission path IF 115 allows the BBU 11 to transmit and receive IP (Internet Protocol) packets to and from the core network or other base stations. The transmission path IF 115 executes a process related to the IP packets.

The maintenance monitoring control unit 111 controls the entire base station apparatus 10, monitors and controls the BBU 11, the RRH 12, and the relay device 13, and executes an OAM (Operations, Administration, and Maintenance) process. An example of the monitoring and control by the maintenance monitoring control unit 111 includes control related to a BBU-RRH interface protocol described later. The call processing unit 112 executes call processing related to an outgoing call of a wireless terminal (User Equipment (UE): not illustrated) connected to the base station apparatus 10 and an incoming call from a terminal of a partner.

The baseband unit 113 mainly executes a digital baseband process, such as a multilevel modulation process and an OFDM process, for converting (modulating and demodulating) an IP packet and a baseband signal (OFDM (Orthogonal Frequency Division Multiplexing) signal).

The CPRI interface unit 114 executes an IF protocol process for exchanging a baseband signal (user data) and a control signal with the RRH 12 (relay device 13) according to the BBU-RRH interface protocol (hereinafter, simply described "IF protocol"). Details of the CPRI interface unit 114 will be described later.

As illustrated in FIG. 3A, the CPRI interface unit 114 is connected to the maintenance monitoring control unit 111 and the call processing unit 112 through a transmission path 117 for transmitting and receiving a control signal. The user data is transmitted and received on a path of the CPRI interface unit 114-the baseband unit-the transmission path IF 115.

<<Configuration of RRH>>

Meanwhile, the RRH 12 includes: an optical module 127; a CPRI interface unit 121; an orthogonal modulation demodulation unit (an orthogonal modulator/demodulator) 122 connected to the CPRI interface unit 121; a reception amplifier 123 and a transmission amplifier 124 connected to the orthogonal modulation demodulation unit 122; and a maintenance monitoring control unit (a maintenance monitoring controller) 125 connected to the CPRI interface unit 121. The reception amplifier 123 and the transmission amplifier 124 are connected to an antenna unit 126.

The CPRI interface unit 121 executes an IF protocol process for exchanging a baseband signal (user data) and a control signal with the BBU 11 (relay device 13) according to the IF protocol. Details will be described later.

The orthogonal modulation demodulation unit 122 executes an orthogonal modulation process of converting a baseband signal (user data) obtained from the CPRI interface unit 121 to an RF signal (analog signal) with a radio frequency (RF) and an orthogonal demodulation process of converting an RF signal obtained from the reception amplifier 123 to a baseband signal (user data).

The transmission amplifier 124 includes an up-converter that up-converts an RF signal to a frequency of a radio wave and a transmission amplifier (power amplifier) that amplifiers the radio wave. The reception amplifier 123 includes a reception amplifier (for example, low noise amplifier) that amplifies a radio wave from the antenna unit 126 and a down-converter that converts the amplified radio wave to a frequency for processing by the orthogonal modulation demodulation unit 122.

The antenna unit 126 includes: a transmission reception antenna; and a duplexer that transmits a radio wave from the transmission amplifier 124 to the antenna and that transmits a radio wave received by the antenna to the reception amplifier 123. The antenna unit 126 may also include: a transmission antenna that emits a radio wave from the transmission amplifier 124; and a reception antenna that receives a radio wave from a mobile terminal to be supplied to the reception amplifier 123. In this way, the antenna unit 126 performs wireless communication (transmission and reception of radio waves) with the mobile terminal connected to the base station apparatus 10.

The maintenance monitoring control unit 125 monitors and controls the entire RRH 12. The maintenance monitoring control unit 125 also performs monitoring and control related to the IF protocol. The maintenance monitoring control unit 125 has functions equivalent to the maintenance monitoring control unit 111 regarding the monitoring and control related to the IF protocol. The maintenance monitoring control units 111 and 125 are examples of a control unit or a control apparatus.

<<Hardware Configurations of BBU and RRH>>

As illustrated in FIG. 3B, the maintenance monitoring control unit 111 and the call processing unit 112 of the BBU 11 illustrated in FIG. 3A can be realized by an MPU (Micro Processing Unit, also called "CPU") 111a as an example of a processor and by a memory 111b.

The memory 111b includes a non-volatile storage medium (for example, ROM, EEPROM, flash memory, hard disk, or the like) and a volatile recording medium (RAM, DRAM, or the like) and stores various programs executed by the MPU 111a and data used in the execution of the programs. Processes executed by the maintenance monitoring control unit 111 and the call processing unit 112 are functions realized by the execution of the programs by the MPU 111a.

The transmission path IF 115 is realized using a network processor (NWP) 115A. A NIC (Network Interface Card) that includes a LAN can also be applied as the transmission path IF 115. The baseband unit 113 can be realized using a DSP (Digital Signal Processor) 113a as an example of the processor and using a memory 113b that stores programs executed by the DSP 113a and data used in the execution of the programs. The memory 113b includes a volatile recording medium and a volatile recording medium as described above.

The CPRI interface unit 114 can be realized using an FPGA (Field Programmable Gate Array) 114a. In FIG. 3B, the MPU 111a (maintenance monitoring control unit 111 and call processing unit 112), the NWP 115A (transmission path IF 115), the DSP 113a (baseband unit 113), and the FPGA 114a (CPRI interface unit 114) are connected through a switch circuit (SW) 111c. According to the configuration, the user data is transmitted and received on a path of the NWP 115A-the SW 111c-the DSP 113a-the FPGA 114a. Meanwhile, the control signal is transmitted on a path of the FPGA 114a-the SW 111c-the MPU 111a.

The CPRI interface unit 121 included in the RRH 12 is realized using an FPGA 121a. The orthogonal modulation demodulation unit 122 can also be realized using an FPGA 122a. The FPGA 121a and the FPGA 121b can be integrated.

The maintenance monitoring control unit 125 can be realized using an MPU (CPU) 125a as an example of the processor and using a memory 125b. The memory 125b stores programs executed by the MPU 125a and data used in the execution of the programs. The memory 125b includes a volatile recording medium and a non-volatile recording medium as described above.

The memories 111b, 113b, and 125b are examples of storage devices. The functions realized by the MPU 111a, the MPU 125a, the DSP 113a, the FPGA 114a, the FPGA 121a, and the FPGA 122a may be realized by dedicated hardware (electronic circuit) such as an ASIC (Application Specific Integrated Circuit) or by a combination of the dedicated hardware and general-purpose hardware.

<Configuration of CPRI Interface Units>

Next, an example of a configuration of the CPRI interface units 114 and 121 will be described.

<<Protocol Configuration>>

Figure 4:
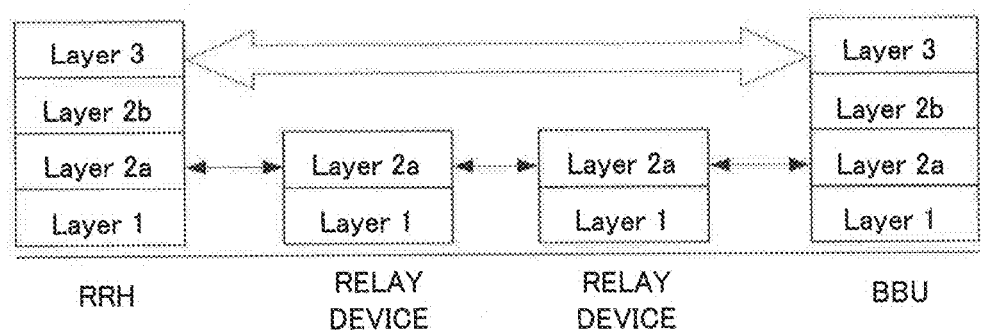
FIG. 4 is an explanatory diagram of a protocol stack of a BBU-RRH interface protocol applied to the base station apparatus.

First, the IF protocol used by the BBU 11, the RRH 12, and the relay device 13 will be described. FIG. 4 is an explanatory diagram of a protocol stack of the BBU-RRH interface protocol applied to the base station apparatus 10. The IF protocol illustrated in FIG. 4 is equivalent to a modification of the CPRI protocol (FIG. 1).

As illustrated in FIG. 4, the IF protocol has a structure in which a layer 2b, a layer 2a, and a layer 1 are arranged below the layer 3 in the CPRI protocol, in place of the layer 2. The layer 2b is arranged higher than the layer 2a.

The layer 2b is arranged just below the layer 3 (equivalent to the layer 3 of the CPRI protocol). The layer 2b includes, as an interface with the layer 3, an interface equivalent to the interface of the layer 3 included in the layer 2 of the CPRI protocol.

Figure 5:
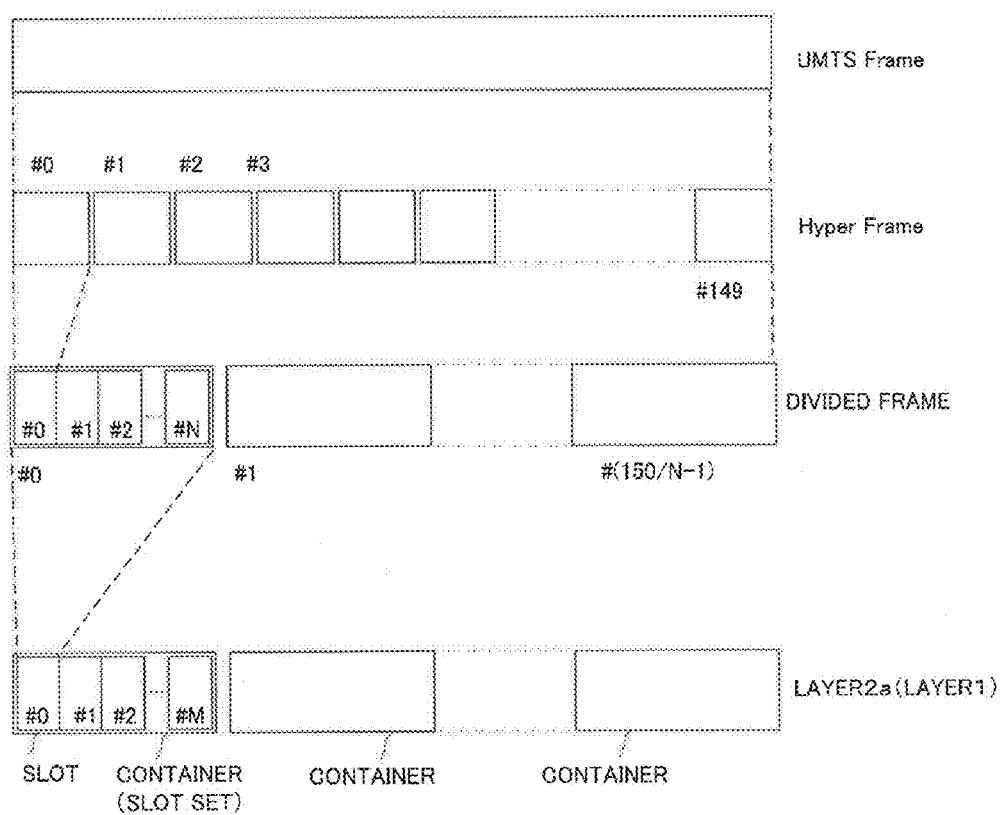

FIG. 5 is a diagram for describing a function of the layer 2b. The layer 2b obtains data of one UMTS frame from the layer 3 (data of the layer 3 (such as user data and C&M data)). The data is divided into data corresponding to 150 hyper frames (#0 to #149). The UMTS frame is an example of a wireless frame.

The layer 2b generates a plurality of divided frames by dividing the UMTS frame, each divided frame including a predetermined number (N) of hyper frames. More specifically, the layer 2b generates 150 hyper frames and organizes the hyper frames by the predetermined number N to generate frames in smallest transmission units for transmission and reception between the devices of the base station 10. The frames are called "divided frames" in the present specification. The divided frames are an example of data blocks obtained by equally dividing a wireless frame.

The size of the divided frame (the number of hyper frames N) is fixed (has a fixed size) in the system (in the base station apparatus 10). To equalize the sizes of the divided frames generated from one UMTS frame, the value of N is selected from a divisor of 150 that can equally divide 150 which is the number of hyper frames. The user data is digitally mapped, as IQ data, in the IQ data area in the hyper frame, and the C&M data is mapped in the control word area of the layer 2b.

The layer 2b generates a header of the divided frame by storing predetermined data in an undefined area (free area) in the divided frame, such as a Vender Specific area and a Reserve area included in the control word area of the hyper frame. This can efficiently use the free area.

The header of the divided frame includes at least a destination ID of the divided frame. A unique identifier (ID) provided to the BBU 11, the RRH 12, and the relay device 13 corresponding to the destination of the divided frame is set as the destination ID.

A control command is also set in the header of the divided frame in some cases. The control command includes a control type (control command ID) and a device ID (destination ID) to be controlled. The control command can further include an identifier (reception port number) of a reception port to be controlled according to the control type. The control types include "reset (reactivate)", "block", and "rewrite sorting table".

The layer 2a has functions equivalent to the layer 2 of the CPRI protocol and includes an interface with the layer 1 in the IF protocol, the interface equivalent to the interface between the layer 1 and the layer 2 in the CPRI protocol. The layer 2a terminates the connection between the devices (between the BBU 11 and the RRH 12, between the BBU 11 and the relay device 13, between the RRH 12 and the relay device 13, and between the relay devices 13).

In the layer 2a, frames (will be called "slots") for storing data in a certain size are generated on the layer 1 between the devices. The size of the slot is the same as the size of the divided frame in the layer 2b.

The layer 2a further stores the slots in transmission units called slot sets (containers), each set including a predetermined number of slots (M). The value of M is determined according to the band of the physical line in the layer 1 between the devices. The value of M is determined to surely transmit the IQ data between the BBU 11 and the RRH 12 within one UMTS frame time interval (time from the arrival of a UMTS frame to the arrival of the next UMTS frame). Therefore, the value of M (size of slot set (container)) varies according to the band of the physical line between the devices.

In the layer 1, the container is sent to a counter device by a predetermined transmission method. In the present embodiment, counter devices are connected by an optical interface, and an optical module on the transmission side converts the container (electrical signal) to an optical signal and sends the optical signal to a physical cable (optical fiber). An optical module on the reception side converts an optical signal received from the physical cable (optical fiber) to an electrical signal (container).

In this way, in the IF protocol of the embodiment, the functions of the layer 2b and the layer 2a map the data stored in the UMTS frame in the divided frames formed by N hyper frames and send the data to the destination (counter device) in containers for storing M divided frames.

As for the user data, the IF protocol can be realized by replacing the layer 2 and lower layers of the CPRI protocol with the layer 2b and lower layers of the IF protocol.

<<Apparatus Configuration of CPRI Interface Unit>>

Figure 6:
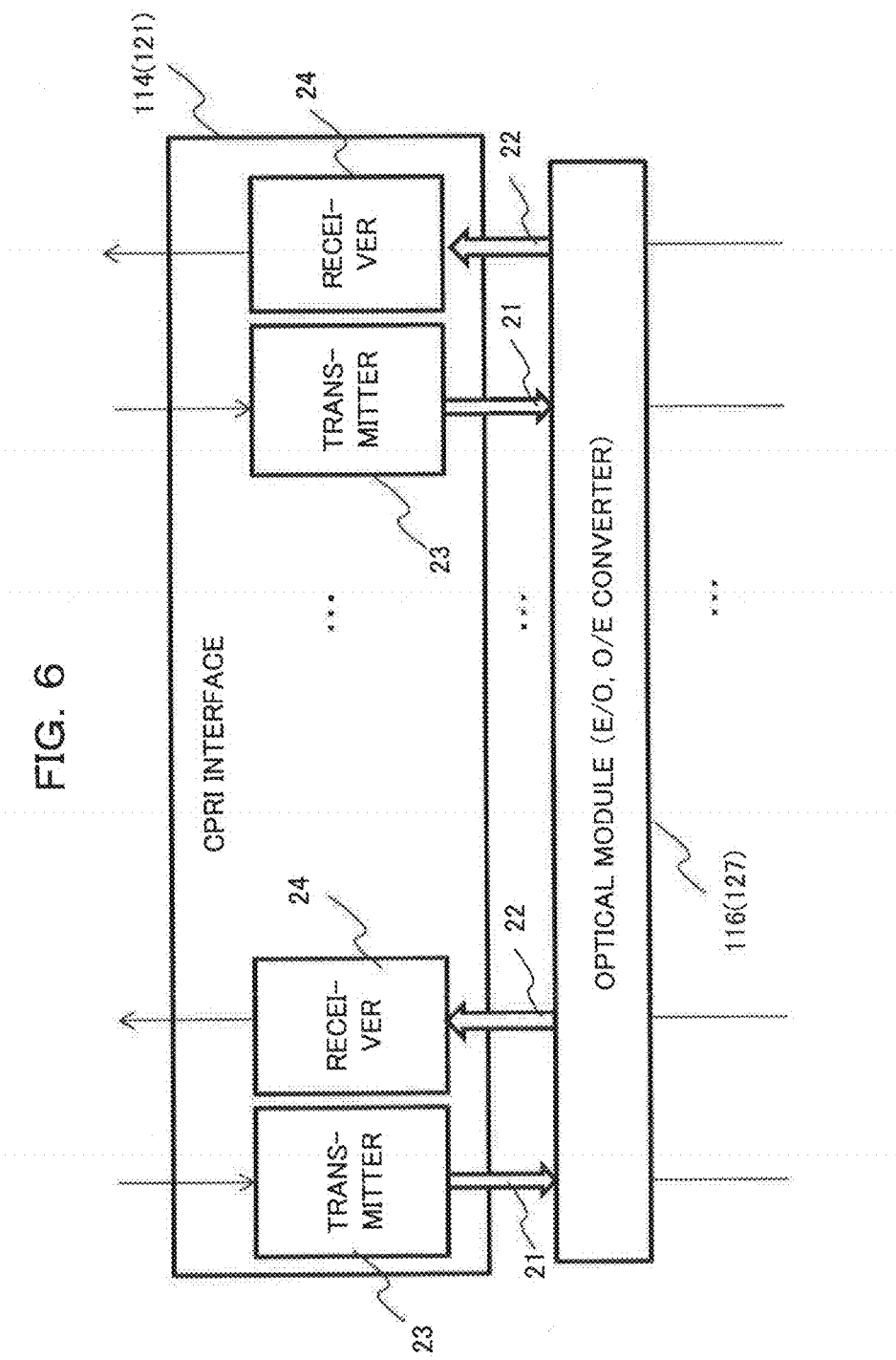
FIG. 6 is a diagram illustrating an example of a configuration of a CPRI interface unit.

FIG. 6 is a diagram illustrating details of the CPRI interface units 114 and 121 illustrated in FIG. 3A. The CPRI interface unit 114 and the CPRI interface unit 121 can have the same configuration. The CPRI interface unit 114 will be described as an example. The CPRI interface unit 114 includes a plurality of sets (e.g. pair) of transmission ports 21 and reception ports 22. A transmission unit (transmitter) 23 and a reception unit (receiver) 24 are arranged for each set of the transmission port 21 and the reception port 22.

The transmission unit 23 executes the processes related to the layer 2b and the layer 2a of the IF protocol, including the process of generating divided frames from the data of a UMTS frame, the process of providing headers to the divided frames, and the process of storing the divided frames in the slot sets. The container is sent out from the transmission port 21. The maintenance monitoring control unit 111 (125) that executes a process related to a higher-level application of CPRI supplies the destination ID and the control command to the CPRI interface unit 114 (121). The transmission unit 23 sets the supplied destination ID and control command as the header.

Each set of the transmission port 21 and the reception port 22 is connected to the optical module (E/O conversion apparatus) 116 (the optical module 127 in the case of the CPRI interface unit 121). The optical module 116 (optical module 127) houses one or more optical fibers (optical lines) corresponding to the set of the transmission port 21 and the reception port 22 and performs electric-optic conversion for converting the container from the transmission port 21 to an optical signal to send the optical signal to the optical fibers. The optical module 116 (optical module 127) converts an optical signal received from the optical fibers to an electrical signal (slot set) by optic-electric conversion and sends the electric signal to the corresponding reception port 22.

When a slot set is received from the optical module 116 (optical module 127), the reception unit 24 executes a process of obtaining divided frames from each slot of the slot set and a process of generating data of a UMTS frame from the divided frames. Of the data of the UMTS frame, the user data is transmitted to the baseband unit 113, and the control signal is transmitted to the call processing unit 112 or the maintenance monitoring control unit 111 through the transmission path 117. Meanwhile, when data of a UMTS frame is generated by assembling the divided frames, the reception unit 24 of the CPRI interface unit 121 transmits the user data of the data of the UMTS frame to the orthogonal modulation demodulation unit 122 and transmits the control signal to the maintenance monitoring control unit 125.

<Configuration of Relay Devices>

FIG. 7A illustrates an example of a functional block configuration of the relay devices 13 (13A, 13B, and 13C), and FIG. 7B illustrates an example of a hardware block configuration of the relay devices 13 (13A, 13B, and 13C). In FIG. 7A, the relay device 13 includes a plurality of (two or more) transmission and reception ports (#0 to #n). Each transmission and reception port includes a transmission port and a reception port. Each transmission and reception port is provided with a predetermined port number. In the present embodiment, the same number is used for the reception port number and the transmission port number. However, different numbers may be used.

Each transmission and reception port is provided with a reception unit (receiver) 131, a sorting (allocation) processing unit (a sorting processor) 132, a transmission unit (transmitter) 133, and a sorting table (allocation table) 134 referenced by the sorting processing unit 132. The sorting processing unit 132 and the transmission unit 133 corresponding to each transmission and reception port are connected to a switch (SW) 135. The switch 135 is connected to a control unit 138.

The transmission and reception ports are directly connected between the devices in the layer 1 in the IF protocol. Specifically, each set of the reception unit 131 and the transmission unit 133 is connected to an optical module 137 that performs optic-electric conversion in the layer 1.

Each reception unit 132 receives a slot set (container) from the corresponding reception port. Each reception unit 132 acquires M divided frames from each slot of the slot set and supplies the divided frames to the sorting processing unit 132.

Each sorting processing unit 132 refers to the destination ID of the header provided to the divided frames and the corresponding sorting table 134 to obtain a transmission port number corresponding to the destination ID included in the header. Each sorting processing unit 132 provides the transmission port number to the divided frames and transmits the divided frames to the switch 135.

The sorting table 134 is a conversion table of the destination and the transmission port of the received signal (divided frames). The sorting table 134 can be prepared for each reception port of the relay device 13.

FIG. 8 illustrates an example of a data structure of the sorting table 134. The sorting table 134 stores entries corresponding to destination IDs. The entries store information indicating transmission port numbers corresponding to the destination IDs, priorities for the transmission port numbers, and states. Therefore, the entries store a correspondence between the destination IDs (destinations of divided frames) and the transmission port numbers (transmission ports of divided frames).

In the sorting table 134, entries including a plurality of transmission port numbers can be registered for one destination ID. The priorities indicate priority orders of use for a plurality of entries in which the same transmission port number is registered. If the divided frames are transferred from a transmission port according to an entry in which the state registered in the sorting table 134 is "normal", the divided frames are received by a device with the destination ID through a downstream relay device 13 (if exists), unless an error including a failure of the physical line occurs.

For example, in the example of FIG. 8, an entry of a transmission port number "Port#3" (example of a first correspondence corresponding to a first path) and an entry of a transmission port number "Port#2" (example of a second correspondence corresponding to a second path) are registered for a destination ID "001002". The priority of the "Port#3 is "1", and the priority of the "Port#2" is "2". In this case, the entry with the transmission port number "Port#3" is preferentially used.

The entries further store data indicating the states of the transmission ports to manage the transmission ports. The state of the transmission port is defined by one of "normal", "failed", and "blocked", for example. The state "normal" indicates a state in which the transmission port specified by the transmission port number in the same entry can transmit a signal to the device with the destination ID. The state "failed" indicates a state in which a signal is not transmitted from the transmission port to the device with the destination ID. The state "blocked" indicates a state in which the operation of the transmission port is stopped in relation to the user data. In the blocked state, the user data is not transferred, but a control command can be transferred.

In the example illustrated in FIG. 8, for example, "failed" is stored as the state in the entry "Port#3" corresponding to the destination ID "001002", and "normal" is stored as the state in the entry "Port#2". In this case, the entry "Port#3" is not used in the allocation process, and the entry "Port#2" is used in the allocation process.

The switch 135 transmits the divided frames to the transmission unit 133 corresponding to the transmission port number provided to the divided frames. The transmission unit 133 houses the received divided frames in the slots (containers) again and sends the slots to the counter device (next device). Each reception unit 131 and each transmission unit 133 adjust timing for synchronizing uplink and downlink wireless data in each reception port and transmission port. Based on a control signal, the control unit 138 executes a process of rewriting the sorting table 134 or notifying various errors, such as a failure of a transmission path.

As illustrated in FIG. 7B, for example, a DSP 136 executes programs stored in a memory 134A to realize the functions of the reception unit 131, the sorting processing unit 132, and the transmission unit 133 in the relay device 13 illustrated in FIG. 7A. The memory 134A stores the programs executed by the DSP 136 and data used in the execution of the programs. The sorting table 134 is stored in the memory 134A.

An MPU 138A executes programs stored in a memory 139 to realize the functions of the control unit 138. The memory 139 stores programs executed by the MPU 138A and data used in the execution of the programs. Detailed configurations of the memory 134A and the memory 139 can be similar to the configuration of the memory 111b.

Figure 9:
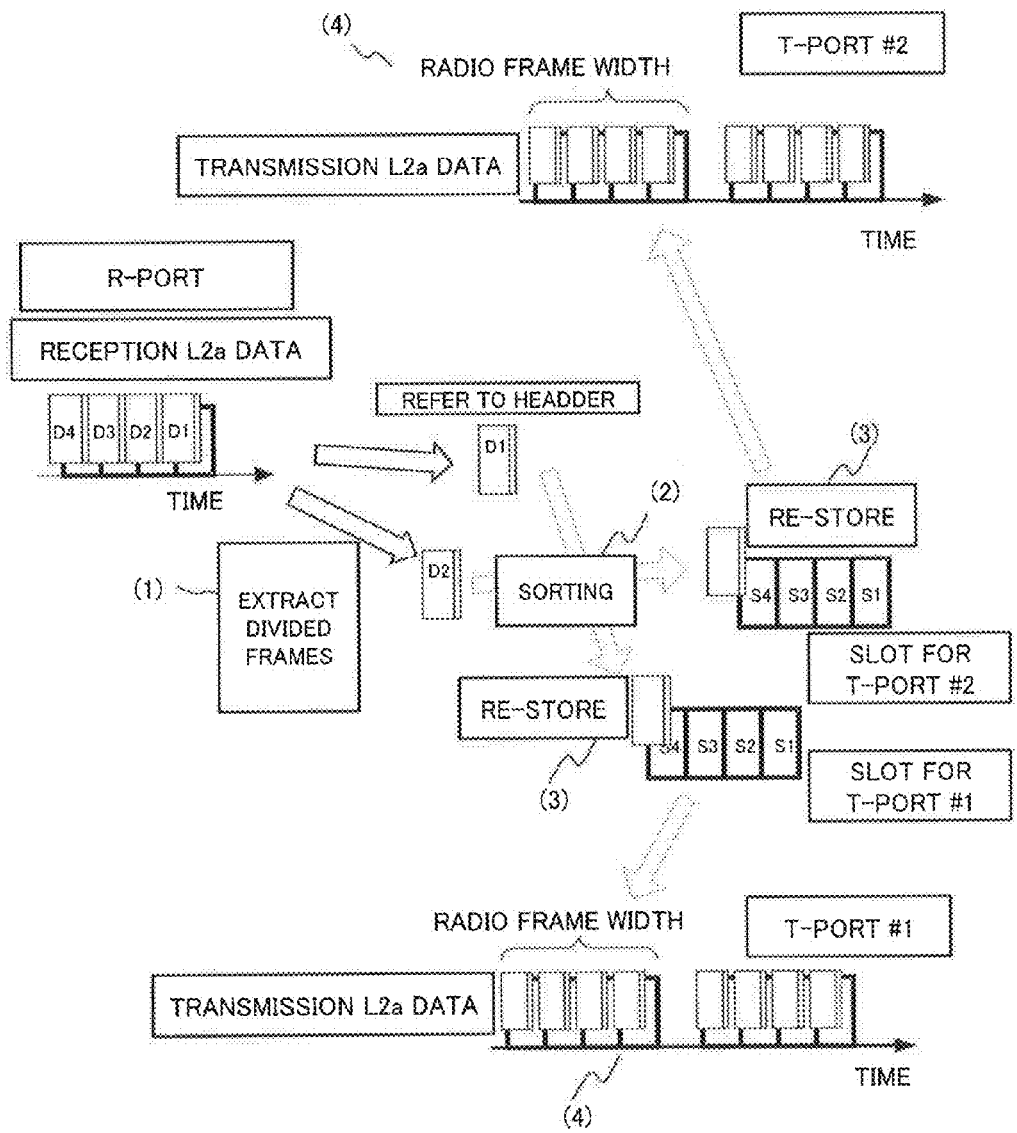
FIG. 9 is a schematic explanatory diagram of a process in the relay device.

FIG. 9 is a schematic explanatory diagram of a process in the relay device 13. In FIG. 9, when divided frames (reception layer 2a data) stored in one slot set (container) are received from a reception port, the reception unit 131 extracts the divided frames from each slot and supplies the divided frames to the sorting processing unit 132 (FIG. 9(1)).

The sorting processing unit 132 acquires, from the sorting table 134, the transmission port numbers corresponding to the destination IDs included in the headers of the divided frames and transmits the divided frames to the transmission units 133 that house the transmission ports with the transmission port numbers through the switch 135. Therefore, the divided frames are sorted to the transmission ports according to the destination IDs of the divided frames (FIG. 9(2)).

Each transmission unit 133 stores the divided frames in the slots again (FIG. 9(3)) and transmits the slot set (container) to the counter device from the transmission port (FIG. 9(4)).

As illustrated in FIG. 9, the divided frames are transmitted to the next device (counter device) in slot sets (containers) in the relay device 13. In this case, the transmission is synchronized with the transmission timing of the UMTS frame. As for the layer 2a path, the number of BBU-RRH links passing through the relay device 13 is not greater than the number of slots M included in the slot set.

The process for one slot set illustrated in (1) to (4) of FIG. 9 is repeated at a predetermined period T. The period T is a processing delay in the relay device 13. A total value of the periods T in all relay devices as via points of the divided frames between the BBUs 11 and the RRHs 12 is a delay time excluding the transmission delay between the BBUs and the RRHs. In view of this, the value of the period T is determined for each relay device 13 based on the processing performance of the relay device 13, the number of relay devices arranged on the paths between the BBUs and the RRHs, and the amount of delay of a wireless signal (UMTS frame) permitted by the system.

<Example of Setting Base Station Apparatus (Base Station System)>

Figure 10:
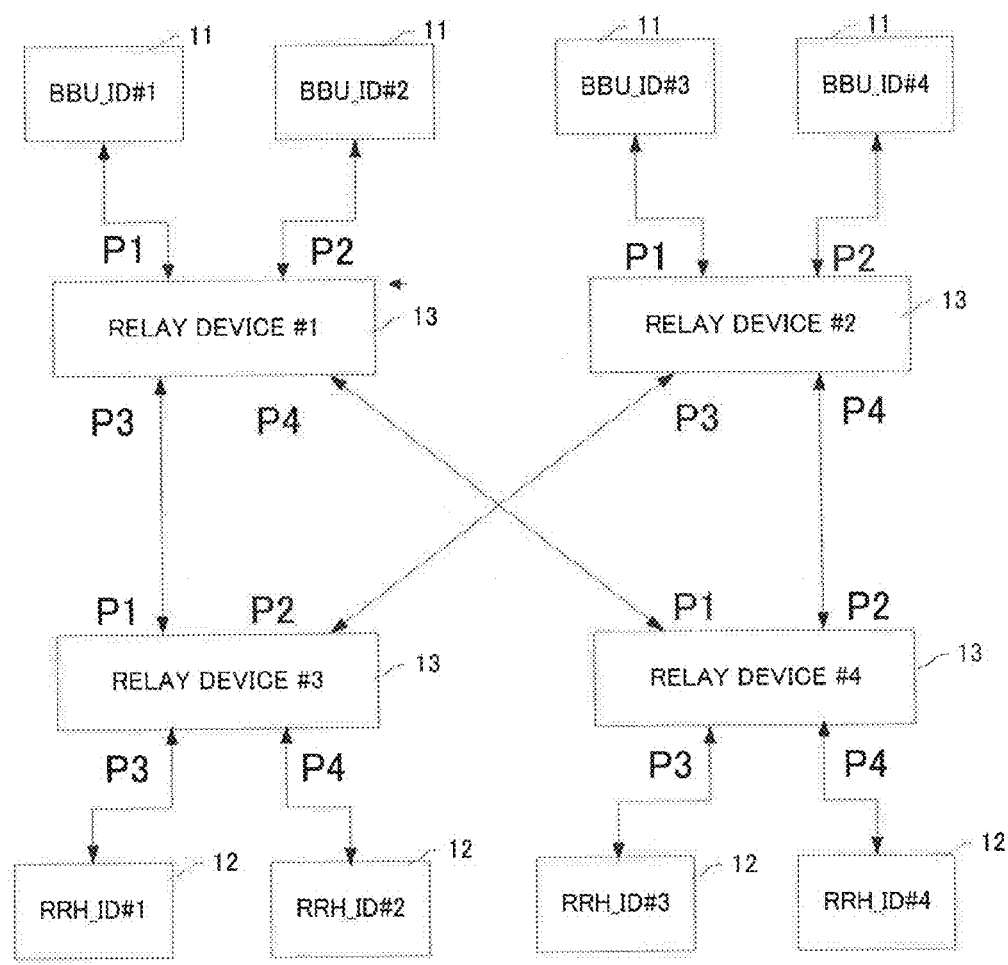
FIG. 10 illustrates an example of setting related to the layer 2a of the base station system.

Next, an example of a base station apparatus (base station system) established using the configurations described so far will be described. FIG. 10 illustrates an example of setting related to the layer 2a of the base station system. Unlike FIG. 2, FIG. 10 illustrates a base station apparatus (base station system) in which four relay devices 13 are used to connect four BBUs 11 and four RRHs 12. "P1" to "P4" described near the links between the devices illustrated in FIG. 10 indicate transmission port numbers or reception port numbers of the links.

FIG. 11A illustrates an example of registration content of the sorting table 134 corresponding to the reception port with the port number "P2" of the relay device 13 (relay device #2) illustrated in FIG. 10. FIG. 11B illustrates an example of registration content of the sorting table 134 corresponding to the reception port with the port number "P2" of the relay device 13 (relay device #4) illustrated in FIG. 10.

According to the registration content of FIGS. 11A and 11B, the relay device 13 (relay device #2) sorts the divided frames transmitted from the BBU 11 (BBU_ID#4) to the relay device #3 and the relay device #4 according to the destination ID. More specifically, the divided frames for RRH_ID#3 (RRH #3) and RRH_ID#4 (RRH #4) are transmitted to the relay device #4, and the divided frames for RRH_ID#1 (RRH #1) and RRH_ID#2 (RRH #2) are transmitted to the relay device #3.

The relay device #4 sorts the divided frames to corresponding transmission ports according to the destination IDs so that the divided frames reach the target RRHs 12. In the relay device #3, the divided frames with the destination ID "RRH_ID#1" are transmitted from the transmission port with the port number "P3" according to the registration content of the sorting table not illustrated, and the divided frames with the destination ID "RRH_ID#2" are transmitted from the port number "P4".

In this way, the relay device 13 implements the function of the layer 2a by allocating the divided frames to the transmission port according to the destination ID to transfer the divided frames to the target termination device (RRH 12 in the example of FIG. 10). Processing of the layer 2b and higher layers is executed between the termination devices (BBU-RRH) to set logical paths to the BBUs 11 and the RRHs 12, and processing similar to the processing when the BBUs 11 and the RRHs 12 are directly connected can be executed.

<Error Process>

Next, a process of detecting an error generated in the allocation process related to the layer 2a (transfer process of divided frames) in the relay device 13 and a process for transmitting an error message to the source counter device of the divided frames will be described.

In the following description, terms "transmission-side termination device", "reception-side termination device", "reception-side counter device", and "transmission-side counter device" will be used. In the present specification, the "transmission-side termination device" denotes a device that generates divided frames from a UMTS frame, and the "reception-side termination device" denotes a device that assembles an UMTS frame from divided frames. Therefore, when a BBU 11 generates and transmits divided frames and an RRH 12 receives the divided frames to assemble a UMTS frame, the BBU 11 is equivalent to the transmission-side termination device, and the RRH 12 is equivalent to the reception-side termination device. Conversely, when an RRH 12 generates and transmits divided frames and a BBU 11 receives the divided frames to assemble a UMTS frame, the RRH 12 is equivalent to the transmission-side termination device, and the BBU 11 is equivalent to the reception-side termination device.

The "reception-side counter device" denotes another apparatus that is positioned just before a relay device 13 in the upstream of the relay device 13 and that directly transmits divided frames to the relay device 13 when the relay device 13 receives the divided frames. The "transmission-side counter device" denotes another apparatus that is positioned just after a relay device 13 in the downstream of the relay device 13 and that directly receives divided frames from the relay device 13 when the relay device 13 transmits the divided frames.

For example, in FIG. 2, when the relay device 13B transfers divided frames received from the BBU 11B to the relay device 13C and the relay device 13D, the BBU 11B is equivalent to the reception-side counter device of the relay device 13B (BBU 11B is also the transmission-side termination device of the divided frames). Meanwhile, the relay device 13C and the relay device 13D are equivalent to the transmission-side counter devices of the relay device 13B. Or, when the relay device 13B transfers the divided frames received from the relay device 13C and the relay device 13D to the BBU 11B, the relay device 13C and the relay device 13D are the reception-side counter devices of the relay device 13B, and the BBU 11B is the transmission-side counter device of the relay device 13B (BBU 11B is also the reception-side termination device of the divided frames).

When each RRH 12 (for example, RRH 12A) transmits the divided frames to the directly connected relay device 13 (for example, relay device 13C), the RRH 12 is the reception-side counter device of the relay device 13 (relay device 13C). On the other hand, when each RRH 12 (for example, RRH 12A) receives the divided frames from the directly connected relay device 13 (for example, relay device 13C), the RRH 12 is the transmission-side counter device of the relay device 13 (for example, relay device 13C).

Figure 12:
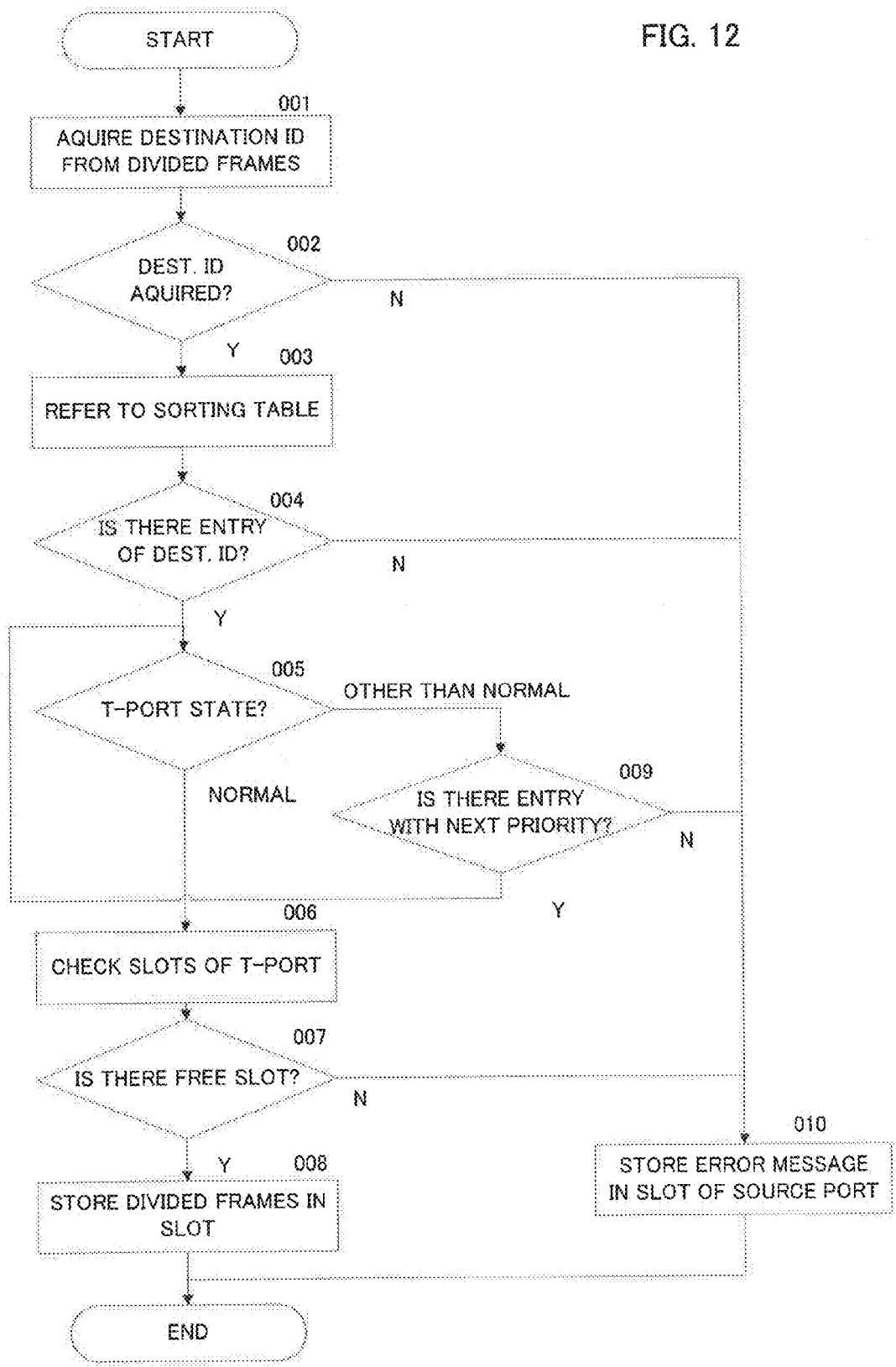
FIG. 12 is a flow chart illustrating an example of an error detection process executed by the relay device.

FIG. 12 is a flow chart illustrating an example of an error detection process executed by the relay device 13. The process illustrated in FIG. 12 is started when the relay device 13 supplies the divided frames to the sorting processing unit 132.

The sorting processing unit 132 attempts to acquire the destination ID from the divided frames (001) and determines whether the destination ID is acquired (002). In this case, if the destination ID is acquired, the process proceeds to 003. On the other hand, if the destination ID is not acquired from the divided frames, the sorting processing unit 132 determines that there is an error, and the process proceeds to 010. In this case, the sorting processing unit 132 notifies the control unit 138 of the error indicating that divided frames do not include the destination ID.

In 003, the sorting processing unit 132 refers to the sorting table 134 to determine whether there is an entry corresponding to the destination ID in the sorting table 134 (004). If there is an entry, the process proceeds to 005. If there is no entry, the sorting processing unit 132 determines that there is an error, and the process proceeds to 010. In this case, the sorting processing unit 132 notifies the control unit 138 of an error indicating that there is no entry.

In 005, the sorting processing unit 132 determines whether the state in the entry found in 004 is normal. In this case, if the state in the entry is normal, the process proceeds to 006. On the other hand, if the state in the entry indicates a state that is not normal (failed or blocked), the process proceeds to 009.

In 009, the sorting processing unit 132 searches for an entry including the same destination ID as the destination ID in the entry and including the next priority of the priority in the entry. If an entry including the next priority is hit, the process returns to 005. On the other hand, if an entry including the next priority is not hit, the sorting processing unit 132 determines that there is an error, and the process proceeds to 010. In this case, the sorting processing unit 132 notifies the control unit 138 of an error indicating that all entries corresponding to the destination ID are not normal (abnormal).

If the determination is affirmative in 005, the divided frames are transferred, through the switch 135, to the transmission unit 133 that houses the transmission port corresponding to the destination ID. The transmission unit 133 that has received the divided frames checks the slot set (container) of the transmission port (006) and determines whether there is a free slot for storing the divided frames (007).

In this case, when there is a free slot, the transmission unit 133 stores the divided frames in the free slot (008), and the process ends. The divided frames are transmitted from the transmission port at the transmission timing of the slot set (container). On the other hand, when there is no free slot, the transmission unit 133 determines that there is an error, and the process proceeds to 010. On the other hand, when there is no free slot, the transmission unit 133 determines that there is an error, and the process proceeds to 010. In this case, the control unit 138 is notified of the error indicating that there is no free slot.

In 010, an error message (divided frames including the error message) is stored in the slot of the source port (transmission port corresponding to the reception port that has received the divided frames with the error).

Figure 13:
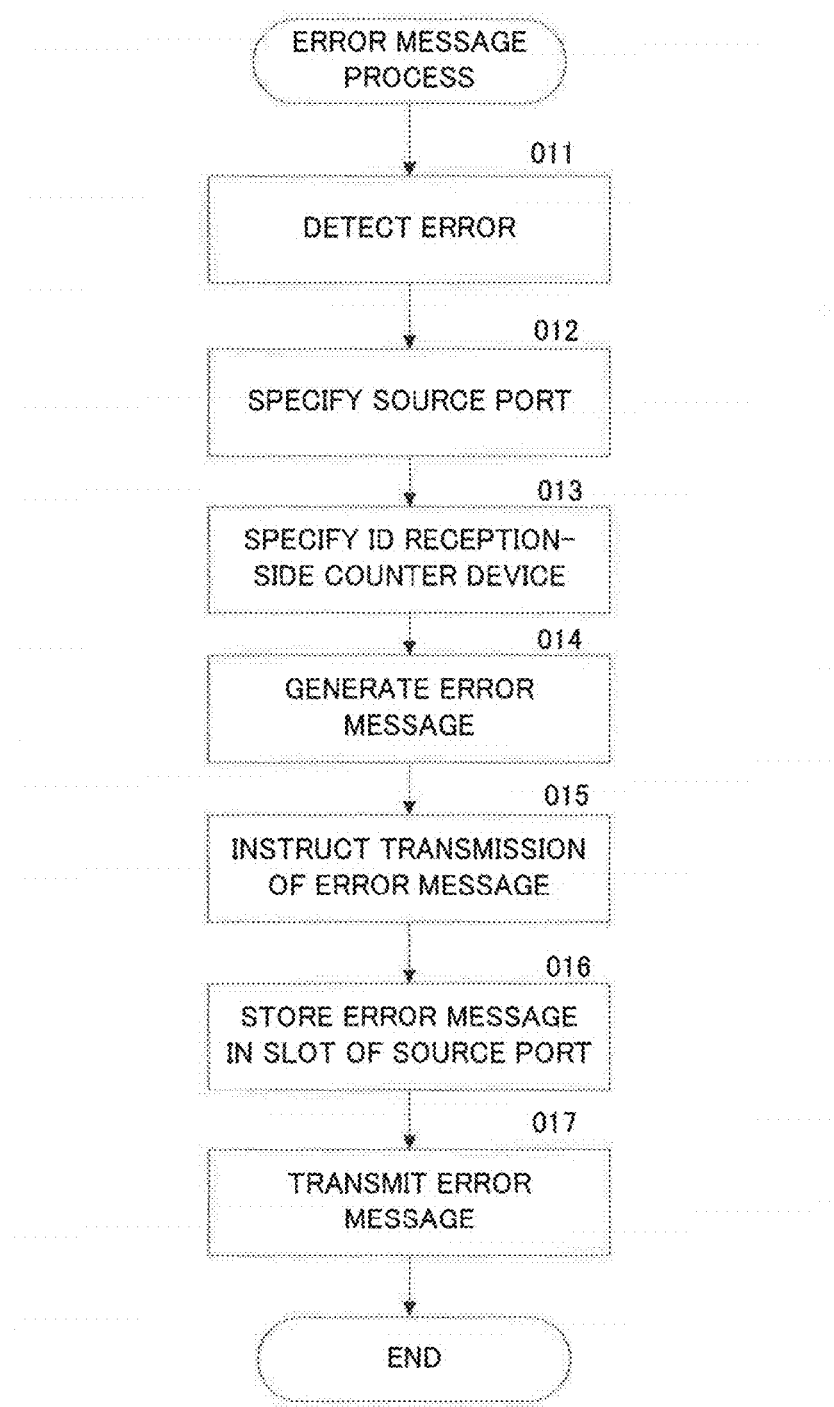
FIG. 13 is a flow chart illustrating an example of an error message process in the relay device.

FIG. 13 is a flow chart illustrating an example of the error message process (process of 010). In 011 of FIG. 13, the control unit 138 receives an error notification from the sorting processing unit 132 or the transmission unit 133 to detect an error. The error notification includes information indicating an error type (no destination ID, no entry, all entries abnormal, or no free slot), and the control unit 138 can recognize the error type. The error notification also includes the destination ID related to the error (no entry, all entries abnormal, or no free slot). When the error type is "no destination ID", the reception port number (stored in the memory 134A) is included, instead of the destination ID.

The control unit 138 specifies the source port (012). FIG. 14 illustrates an example of a data structure of a management table 139A stored in the memory 139 (FIGS. 7A and 7B). In addition to the registration content of the sorting table 134 corresponding to the reception ports of the relay device 13, the management table 139A stores management information related to the transfer of the divided frames, such as source IDs (device IDs of the reception-side counter devices of the divided frames) and the number of free slots in each transmission port. Although not illustrated in FIG. 14, device IDs of the transmission-side termination device of the divided frames are also registered.

In 012, the control unit 138 specifies, from the management table 139A, an entry corresponding to at least one of the reception port number and the destination ID included in the error notification and obtains the reception port number in the specified entry to specify the source port number. In the present embodiment, since the reception port number and the transmission port number are the same number, the transmission port equivalent to the source port can be specified by specifying the reception port number.

The process of 012 can be modified as follows. More specifically, each memory 134A corresponding to each sorting processing unit 132 stores the reception port number of the port (transmission and reception port number). When the sorting processing unit 132 transfers the divided frames to the transmission unit 133 corresponding to the destination ID, the sorting processing unit 132 provides the reception port number. The sorting processing unit 132 and the transmission unit 133 provide error notifications including the reception port number to the control unit 138. When such a configuration is adopted, the control unit 138 can handle the reception port number as the source port number. Therefore, the source port can be specified by referring to the error notification, without referring to the management table 139A.

Next, the control unit 138 acquires the source ID included in the entry specified in 012 to specify the ID of the reception-side counter device of the divided frames (upstream counter device of the divided frames) (013). Next, the control unit 138 generates an error message (014). More specifically, the control unit 138 can include, for example, the error type, the device ID of the relay device 13, the destination ID of the divided frames, the device ID of the reception-side counter device as the destination ID of the error message.

Next, the control unit 138 provides a transmission instruction of the error message to the transmission unit 133 corresponding to the source port (015). The transmission unit 133 stores the divided frames including the error message in the slot (017). In the header of the divided frames, the ID of the reception-side counter device is set as the destination ID. Subsequently, the divided frames including the error message are sent out to the counter device in slot sets.

However, when the error type is "no destination ID" in the process of FIG. 13, the device ID of the transmission-side termination device is acquired in 013 instead of the device ID of the reception-side counter device, and the device ID of the transmission-side termination device is set as the destination ID in the header of the divided frames. In the transmission-side termination device (BBU 11 or RRH 12), the CPRI interface unit 114 or 121 provides the error message to the maintenance monitoring control unit 111 or 125. Consequently, the maintenance monitoring control unit 111 or 125 notifies the CPRI interface unit 114 or 121 of the destination ID to provide the destination ID to the divided frames.

According to the error message process, when the divided frames do not include the destination ID, an error message indicating the error type "no destination ID" is transmitted to the transmission-side termination device.

When the sorting processing unit 132 of the relay device 13 does not discover, from the sorting table 134, the entry corresponding to the destination ID included in the divided frames, an error message of the error type "no entry" is transmitted to the reception-side counter device.

When all entries corresponding to the destination ID in the sorting table 134 indicate failed or blocked transmission ports (no entry in the normal state), an error message of the error type "all entries abnormal" is also transmitted to the reception-side counter device.

An error message is also transmitted to the reception-side counter device when there is no free slot for storing the divided frames. In the relay device 13, the number of slots (M) included in the slot set (container) transmitted from a transmission port is determined according to the transmission capacity of the transmission port. Therefore, in the relay device 13, the number of slots M forming the slot set may be different in each transmission port. As a result, there may be a case in which all M slots forming the slot set are in use. When an error message is transmitted, the divided frames used for the error detection are discarded.

In the process illustrated in FIG. 12, the transmission unit 133 notifies the control unit 138 of the fact that there is no free slot. Meanwhile, the sorting processing unit 132 notifies the control unit 138 of the destination ID before transmitting the divided frames to the transmission unit 133 and inquires for the presence/absence of the corresponding free slot. The control unit 138 refers to the management table 139A to check the presence/absence of the free slot and returns the result to the sorting processing unit 132. When there is a free slot, the sorting processing unit 132 transfers the divided frames to the transmission unit 133. On the other hand, when there is no free slot, the sorting processing unit 132 discards the divided frames. The control unit 138 transmits the error message to the transmission unit 133 of the source port. Such a configuration can also be applied.

<Control of Relay Device>

Next, control in the relay device 13 and control of the relay device 13 by the BBU 11 or the RRH 12 will be described.

<<Process at Reception of Error Message>>

Figure 15:
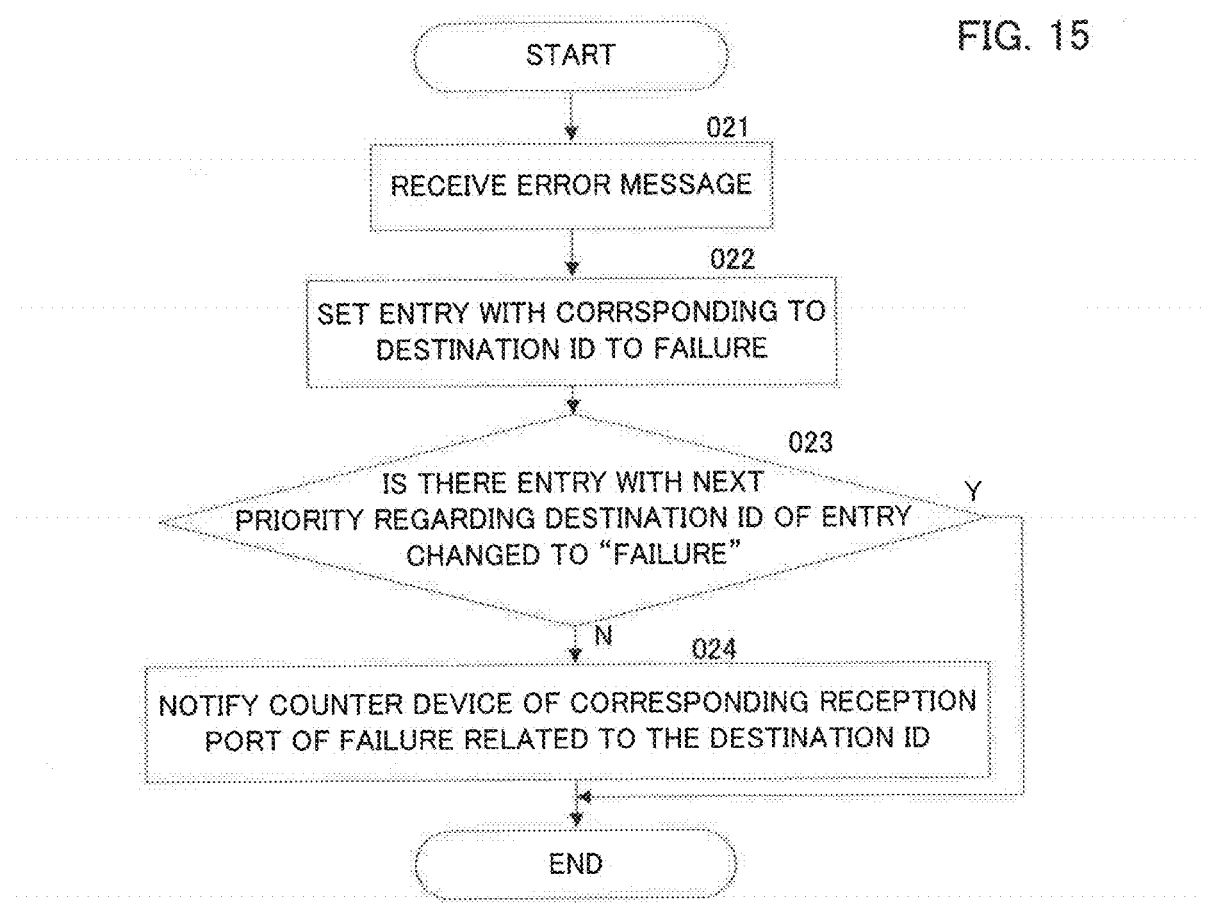
FIG. 15 is a diagram illustrating an example of control operation when a relay device as a reception-side counter device receives an error message.

FIG. 15 is a diagram illustrating an example of control operation when the relay device 13 as the reception-side counter device receives an error message. In the first 021, the control unit 138 of the relay device 13 receives an error message. More specifically, the reception unit 131 of the relay device 13 acquires divided frames of an error message. The sorting processing unit 132 provides the content of the divided frames (error message) to the control unit 138 through the SW 135 if the destination ID provided to the divided frames is the device ID of the relay device 13 that includes the sorting processing unit 132.

For example, when a special entry provided with the ID of the relay device 13 that includes the sorting processing unit 132 is prepared in the sorting table 134 and the special entry is hit, a configuration in which the sorting processing unit 132 notifies the control unit 138 of the information in the divided frames can be applied. However, this configuration is an example, and various configurations in which the sorting processing unit 132 notifies the control unit 138 of the information in the divided frames can be applied when the destination ID is the ID of the device that includes the sorting processing unit 132.

The control unit 138 that has received the error message refers to the management table 139A and extracts, from the management table 139A, the reception port number and the transmission port number corresponding to the destination ID included in the error message to provide a state changing instruction to the sorting processing unit 132 corresponding to the reception port number. The state changing instruction includes the destination ID included in the error message and the transmission port number extracted from the management table 139A. The sorting processing unit 132 changes the state in the entry of the sorting table 134 provided with the destination ID and the transmission port number included in the state changing instruction to "failed" according to the state changing instruction (022).

As in the modified example, when the reception port number (reception port number=transmission port number) is stored in advance in the memory 139A or the like and the control unit 138 is notified of the error message, a configuration of notifying the control unit 138 of the reception port number along with the error message may also be adopted. In this case, the extraction of the reception port number by referring to the management table 139A in the process of 022 is skipped.

At this time, the state information registered in the management table 139A is synchronized and updated. The error type can be further stored in the management table 139A (memory 139) and used as management information.

The sorting processing unit 132 refers to the sorting table 134 to determine whether there is an entry provided with the same destination ID as the destination ID of the entry in which the state is changed to "failed" and provided with the next priority (state "normal") (023). When there is no such an entry, the process illustrated in FIG. 15 ends, and the divided frames received from the reception port are to be transmitted from the transmission port of the transmission port number provided with the entry with the next priority.

On the other hand, when there is no entry with the next priority, the sorting processing unit 132 notifies the control unit 138 of this fact. Consequently, the control unit 138 generates an error message "all entries abnormal" related to the destination ID and provides the error message to the transmission unit 133 of the reception-side counter device. The transmission unit 133 transmits the divided frames including the error message to the reception-side counter device (024).

In this way, the relay device 13 as the reception-side counter device that has received the error message sets the state in the entry of the sorting table 134 corresponding to the error message to "failed". In this case, when there is an entry with the next priority, the relay device 13 enters a state of transmitting the divided frames from the transmission port of the transmission port number registered in the entry (different from the transmission port number related to the error). As a result, the transmission port for transmitting the divided frames is changed, and the divided frames are to reach the reception-side termination device through a different path. More specifically, the transmission path of the divided frames is changed.

When the reception-side counter device that receives the divided frames including the error message transmitted in 024 is the relay device 13, the process of FIG. 15 is executed. When there is an entry (state "normal") with the next priority corresponding to the destination ID, the entry is used to change the path of the divided frames.

<<Control of Relay Device 13 by BBU 11 or RRH 12>>

Next, a process (control of relay device) when an error message (divided frames including the error message) reaches the transmission-side termination device (BBU 11 or RRH12) of the divided frames will be described.

In the transmission-side termination device, an error message (error type "all entries abnormal" or "no free slot") stored in the divided frames is transmitted from the CPRI interface unit 114 (121) to the maintenance monitoring control unit 111 (125). The maintenance monitoring control unit 111 (125) can perform the following operation according to the error message.

(1) Change the transfer path of the divided frames between the termination devices (between the BBU 11 and the RRH 12).
(2) Change the combination of the BBU 11 and the RRH 12.

The operation of (1) and (2) can be performed through the control of the relay device 13 from the termination devices. As described, "reset (reactivate)", "block", and "rewrite sorting table" can be executed as the control of the relay device 13. Hereinafter, the operation of (1) and (2) will be described.

<<Change of Transmission Path of Divided Frames>>

Figure 16:
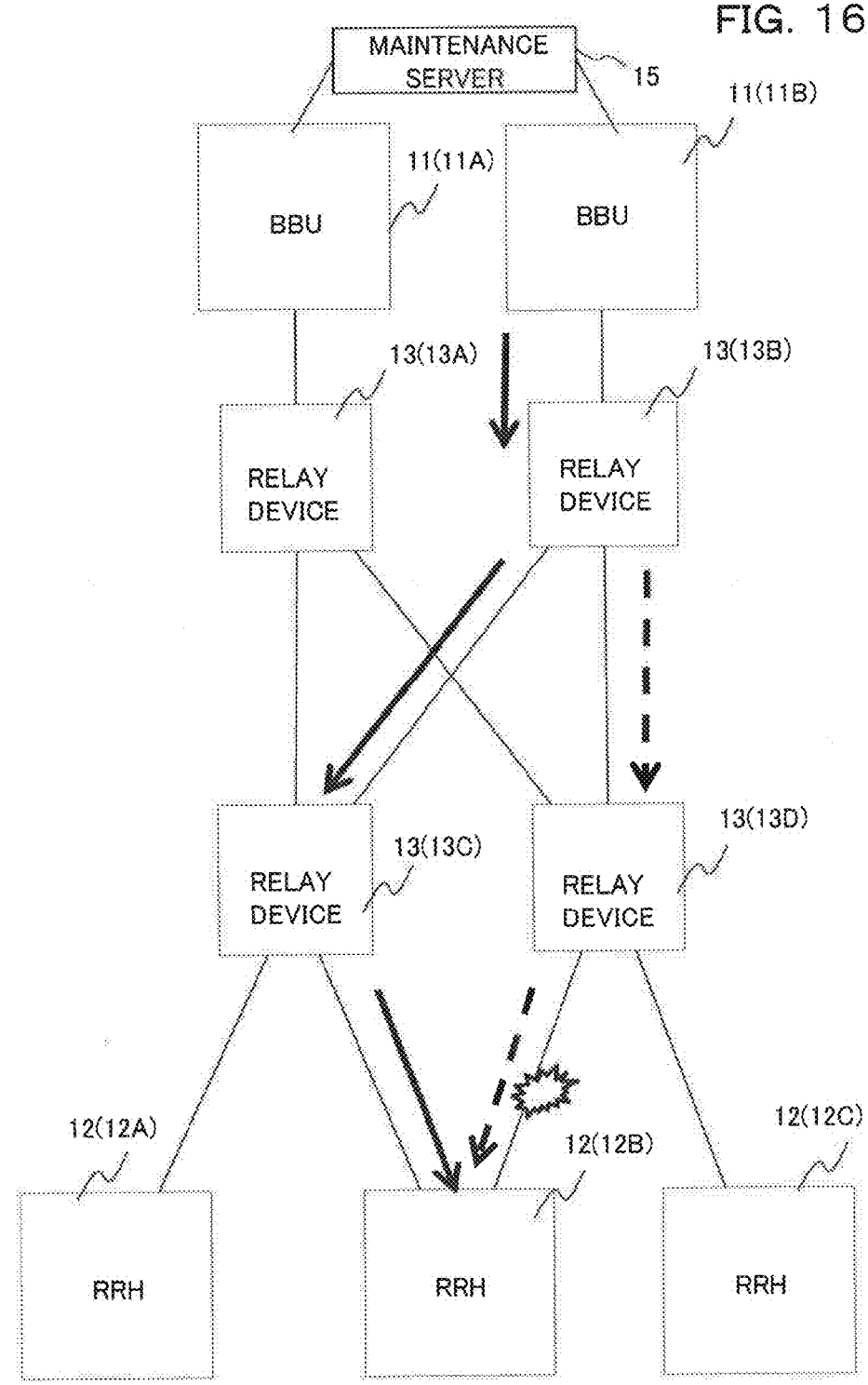
FIG. 16 is an explanatory diagram of a situation related to a change in a path between a BBU and an RRH.

A situation illustrated in FIG. 16 will be simulated for the description. In FIG. 16, a transmission path (layer 2a path) of divided frames of the BBU 11B-the relay device 13B-the relay device 13D-the RRH 12B is set between the BBU 11B and the RRH 12B. Under the situation, when an error "no free slot" occurs in relation to the transmission port for transmitting the divided frames from the relay device 13D to the RRH 12B, the relay device 13D transmits, for example, an error message of the error type "no free slot" to the relay device 13B that is the reception-side counter device. Through the error message, when an error of the error type "all entries abnormal" occurs in the relay device 13B, the relay device 13B transmits an error message of the error type "all entries abnormal" to the BBU 11B that is the transmission-side termination device.

Figure 17:
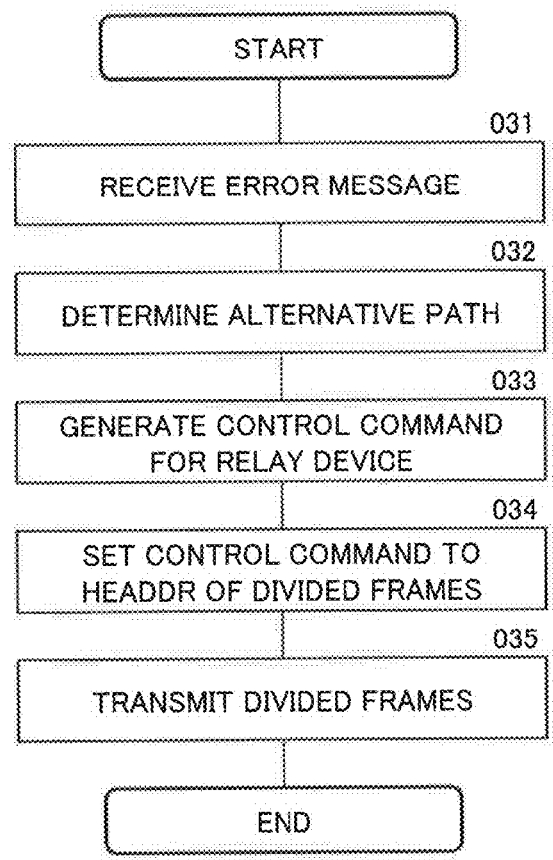
FIG. 17 is a flow chart illustrating a process related to control command transmission of the relay device.

FIG. 17 is a flow chart illustrating a process related to control command transmission of the relay device 13. Although the process in the BBU 11 (BBU 11B) will be described in the following example, the process of the RRH 12 executed under a similar situation is also similar. A maintenance apparatus, such as the maintenance server 15, may be notified of the error message, and the relay device 13 may be controlled at the initiative of the maintenance server 15. In this case, the control unit 111 of the BBU 11 receives an instruction from the maintenance server 15 and controls the relay device 13 (RRH 12 in some cases) according to the instruction.

In FIG. 17, the maintenance monitoring control unit 111 (hereinafter, written as "control unit 111", in the opposite case, "maintenance monitoring control unit 125") of the BBU 11B receives an error message (031).

The control unit 111 refers to maintenance monitoring control information stored in the memory $111b$ (memory $125b$ in the opposite case). The maintenance monitoring control information includes transmission path information of a plurality of divided frames arranged between the BBUs 11 and the RRHs 12.

For each path prepared between the BBUs 11 and the RRHs 12, the transmission path information includes, for example, the device ID of the relay device 13 positioned on the path, the registration content of the sorting table 134 included in the relay device 13, and the free port information of the relay device 13. The transmission path information can also include the free port information of the transmission-side termination device and the reception-side termination device.

The control unit 111 uses the transmission path information to determine a substitute path (032). The determination method of the substitute path is not particularly limited. For example, the control unit 111 determines a substitute path of the BBU 11B→the relay device 13B→the relay device 13C→the RRH 12B. It is assumed here that there is an operated layer $2a$ path for transmitting the divided frames that have reached the relay device 13C to the RRH 12B.

In this case, the control unit 111 determines rewrite control of the sorting table 134 for the relay device 13B and the relay device 13C to set the substitute path and generates a control command (control information) for the relay device 13B (033).

First, the control command is provided to the CPRI interface unit 114 (CPRI interface unit 121 in the opposite case) for the relay device 13B, the control command including the device ID of the relay device 13B to be controlled, the control command ID indicating a control command "block", the reception port number related to the sorting table 134 to be rewritten, and the destination ID of the divided frames (033).

Next, the CPRI interface unit 114 sets the control command to the header of the divided frames (034). The CPRI interface unit 114 transmits the divided frames including the control command to the relay device 13B (035).

Figure 18:
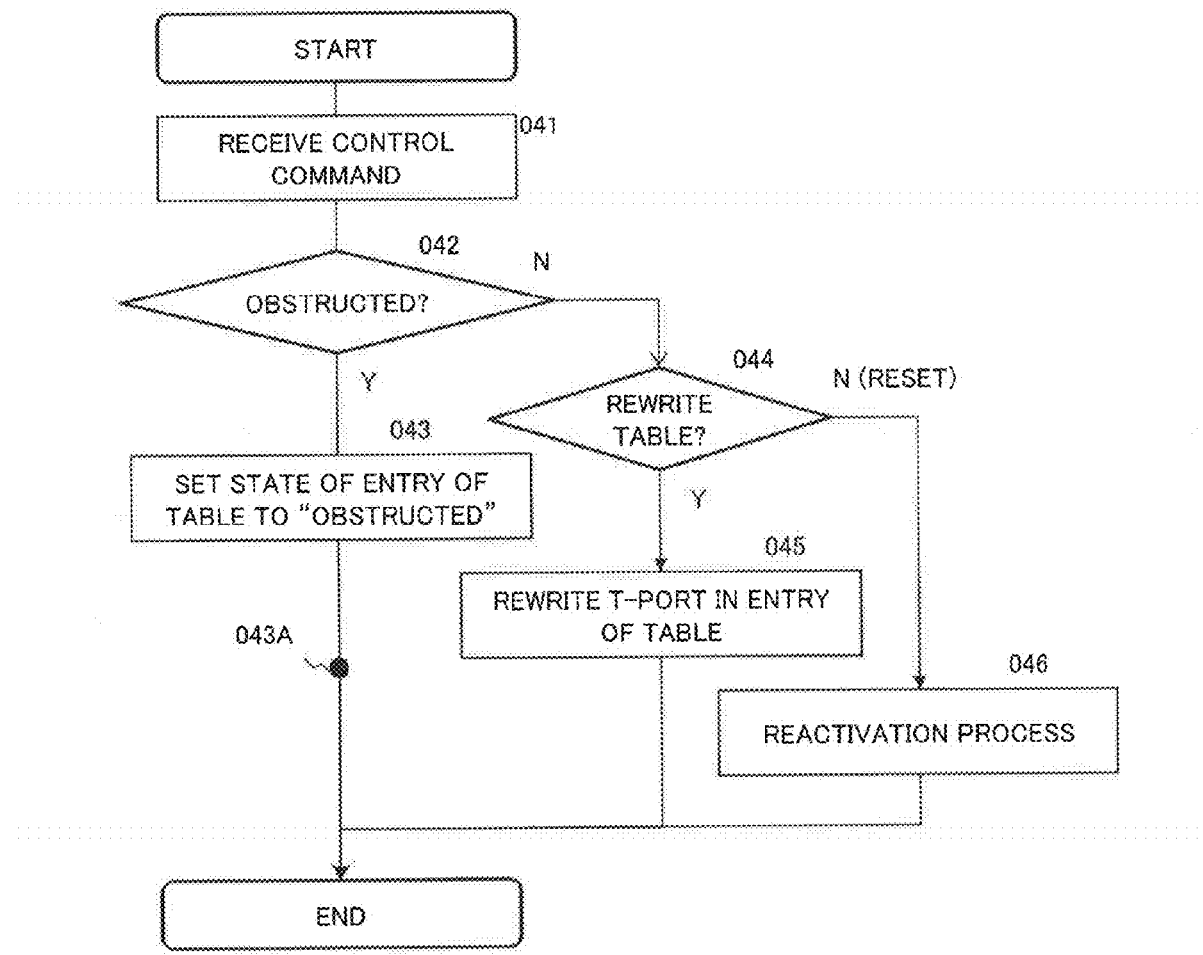
FIG. 18 is a flow chart illustrating an example of a process at reception of a control command in the relay device.

FIG. 18 is a flow chart illustrating an example of a process at reception of the control command in the relay device 13. In the relay device 13B, the sorting processing unit 132 transmits the control command to the control unit 138 based on the destination ID (ID of the relay device 13B) included in the header of the divided frames. As a result, the control unit 138 receives the control command (041).

Next, the control unit 138 determines whether the control command type is "block" based on the control command ID in the control command (042). Since the control command type is "block" here, the states in all entries in the sorting table 134 corresponding to the destination ID is set to "blocked" for the sorting processing unit 132 corresponding to the reception port number (043). In the "blocked" state, the user data is not transferred, but the control command can be transferred. As a result, all entries corresponding to the destination ID of the sorting table 134 enter the failed state, and an error message of the error type "all entries abnormal" is created and transmitted to the reception-side counter device (043A, see FIG. 13).

As a result of the process related to the control command "blocked", the device on the upstream of the relay device 13 does not transmit normal divided frames to the reception port of the relay device 13. In the example of FIG. 16, the transmission port from the relay device 13B to the relay device 13D is blocked.

When the process related to "block" is completed, the control unit 138 can transmit a completion message to the transmission-side termination device (BBU 11B). However, the return of the completion message is optional.

Secondly, the control unit 111 provides a control command to the CPRI interface unit 114 for the relay device 13B, the control command including the device ID (destination ID) of the relay device 13B to be controlled, the control command ID indicating a control command "rewrite sorting table", and the reception port number related to the sorting table 134 to be rewritten.

When the sorting table 134 of the relay device 13 is rewritten, a channel signal that is terminated by the relay device 13 to be controlled and that is for control and monitoring in a layer 3 signal is used to transmit data (rewrite content).

An example of specific rewrite content includes "destination ID (ID of RRH 12B), transmission port number to relay device 13C, priority 1". Such rewrite content is provided to the CPRI interface unit 114. The CPRI interface unit 114 generates a CPRI signal including the rewrite content and the control command and including the ID of the relay device 13B set as the destination ID and transmits the CPRI signal to the relay device 13B. While the CPRI signal (example of content signal) is transmitted, the "block" process is executed to prevent normal divided frames (of user data) from being transmitted on the layer 2a path. The blocked state is removed by another control command.

The relay device 13B receives the CPRI signal related to the control command "rewrite sorting table", and the sorting processing unit 132 provides the control command to the control unit 138 based on the destination ID in the control command (041 of FIG. 18). Since the control command ID indicates "rewrite sorting table" (Y of 044 of FIG. 18), the control unit 138 provides an instruction for rewriting the registration content of the corresponding sorting table 134 to the sorting processing unit 132 according to the rewrite content.

In this way, the sorting processing unit 132 writes the rewrite content in the sorting table 134 (045 of FIG. 18). As a result, a new entry for transmitting the divided frames to the relay device 13C is registered in the sorting table 134. In this case, the state of the new entry is set to "blocked". Therefore, although the user data is not transferred in relation to the entry, the control command can be transferred to the relay device 13C. Instead of adding the new entry, a process of rewriting the transmission port number of the existing entry for the relay device 13D corresponding to the destination ID in the sorting table 134 with the transmission port number for the relay device 13C may be executed (state of the rewritten entry is set to "blocked"). In this case, when there is no entry including the ID of the relay device 13D as the destination ID in the sorting table 134, the entry is added to transmit the control signal (control command) to the relay device 13D.

Thirdly, the control unit 111 provides a control command to the CPRI interface unit 114 for the relay device 13C, the control command including the device ID (destination ID) of the relay device 13C to be controlled, the control command ID indicating the control command "rewrite sorting table", the reception port number related to the sorting table 134 to be rewritten, and the rewrite content. An example of specific rewrite content includes "destination ID (ID of RRH 12B), transmission port number to RRH 12B, priority 1".

The CPRI interface unit 114 generates a CPRI signal that includes the rewrite content and the control command and that includes the ID of the relay device 13D set as the destination ID and transmits the CPRI signal to the relay device 13B. The CPRI signal reaches the relay device 13C through the relay device 13B. The rewriting process of the sorting table 134 illustrated in FIG. 18 is executed, and an entry for transferring the divided frames transmitted from the relay device 13B to the RRH 12B is added to the sorting table 134. In this case, the state of the added entry is set to "blocked".

When the process related to the change in the path of the relay device 13B and the relay device 13C is completed, the control unit 111 of the BBU 11B transmits a control command for removing the blocked state of the entry (switching the state to "normal") to the control unit 138 of the relay device 13C. The control unit 138 of the relay device 13C receives the control command through the relay device 13B and removes the blocked state of the entry.

Subsequently, the control unit 111 of the BBU 11B transmits, to the control unit 138 of the relay device 13B, a control command for rewriting the "blocked" state to the "normal" state in the entry for transferring the divided frames to the relay device 13C. As a result, the divided frames reach the RRH 12B through the path of the BBU 11B→the relay device 13B→the relay device 13C→the RRH 12B (see solid line arrows of FIG. 16). Therefore, the transmission path of the divided frames is switched.

Subsequently, the transmission path of the divided frames established between the BBU 11B and the RRH 12B is used, and the control unit 111 of the BBU 11B provides the maintenance monitoring control unit 125 (control unit 125) of the RRH 12B with an instruction for changing the up path according to the down path. In response to the instruction, the control unit 125 of the RRH 12B applies rewriting control of the sorting table 134 to the relay devices 13C and 13B in order to transmit the divided frames to the BBU 11B through the relay devices 13C and 13B. Specific content of the rewrite control is substantially the same as the process described with reference to FIGS. 17 and 18, and the description will not be repeated. In this way, the transmission path of data transferred between the BBU and the RRH can be changed.

In place of the setting method of the up path at the initiative of the RRH 12, the BBU 11B can execute a process related to the up path (RRH 12B→relay device 13C→relay device 13B→BBU 11B) at the same time during the process related to the switch of the transmission path for the down path. More specifically, a control command for changing the up path can be provided to the relay device 13C and the relay device 13B along with the control command for changing the down path to change the content of the sorting table 134 related to the up path.

As illustrated in FIG. 18, when the control unit 138 receives a control command "reset" issued from the control unit 111 or the control unit 125 (Y of 044), the control unit 138 executes a reactivation process of the device that includes the control unit 138. The control by the reset is executed at the detection of the device failure of the relay device 13, for example. This is because when the device failure is caused by a so-called soft error, there is a possibility of solving the soft error by resetting (reactivation).

<<Operation at Occurrence of Failure in Transmission Path (Including Changing Transmission Path)>>

Next, operation and process of the relay device 13 and the transmission-side termination device at the occurrence of a failure in the transmission path will be described. For the description, an example in which the transmission path (layer 2a path) of the divided frames of the BBU 11B-the relay device 13B-the relay device 13D-the RRH 12B is set between the BBU 11B and the RRH 12B will be simulated as illustrated in FIG. 16. Under the situation, it is assumed that the physical line (optical fiber) connecting the relay device 13D and the RRH 12B is cut.

Figure 19:
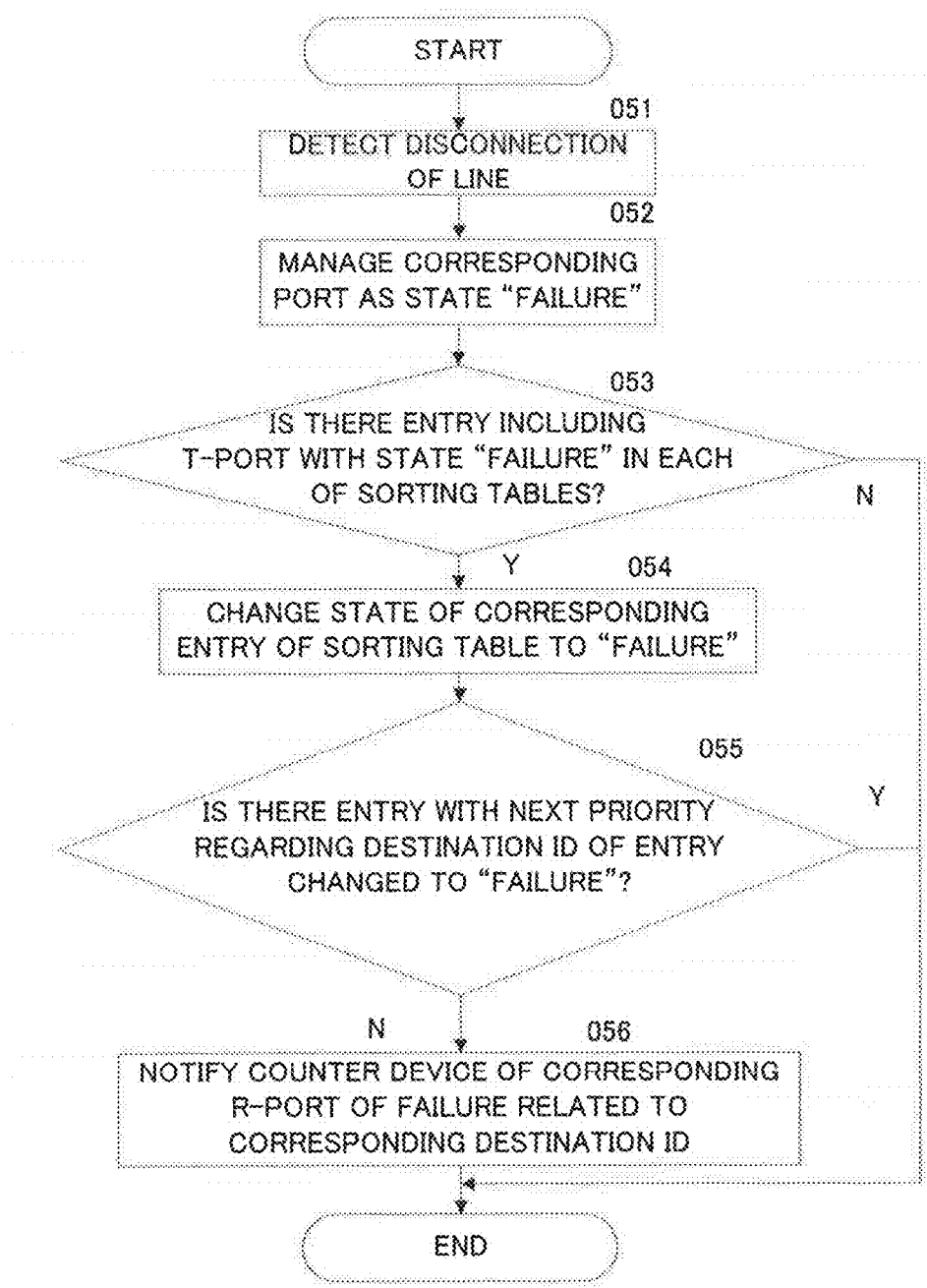
FIG. 19 is a flow chart illustrating an example of a process in the relay device at a failure of a transmission path.

FIG. 19 is a flow chart illustrating an example of a process in the relay device at the failure of the transmission path. In FIG. 19, when a downstream physical line is cut in the relay device 13 (for example, the relay device 13D in FIG. 16), a light receiving level in the optical module 137 drops below a threshold, for example. The control unit 138 detects the reduction in the light receiving level to detect the cut of the physical line (051).

The control unit 138 manages the state of the transmission port related to the cut of the physical line as the "failed" state (052). The state of the transmission port is managed by the management table 139A, for example.

Subsequently, the control unit 138 determines whether an entry including the transmission port number of the transmission port determined to be in the failed state in 052 is included in each sorting table 134 (053). In this case, when the entry of the transmission port number related to the failure is not registered in any sorting table 134, the process of FIG. 19 ends.

On the other hand, when there is the entry of the transmission port number related to the failure, the control unit 138 changes the state of the entry to "failed" in each sorting table 134 including the entry (054).

Next, the control unit 138 determines whether there is an entry (state "normal") with the next priority provided with the same destination ID as the destination ID of the entry in the sorting table 134 including the entry in which the state is changed to "failed" (055). In this case, when all sorting tables 134 including the entry in which the state is changed to "failed" include the entry with the next priority, the process of FIG. 19 ends.

On the other hand, when there is no entry with the next priority in an sorting table 134, a process similar to the error message process illustrated in FIG. 13 is executed, and an error message (failure notification) is transmitted to the counter device of the reception port corresponding to the sorting table 134. The error message (failure notification) is transmitted for each sorting table 134 not including the entry with the next priority.

Figure 20:
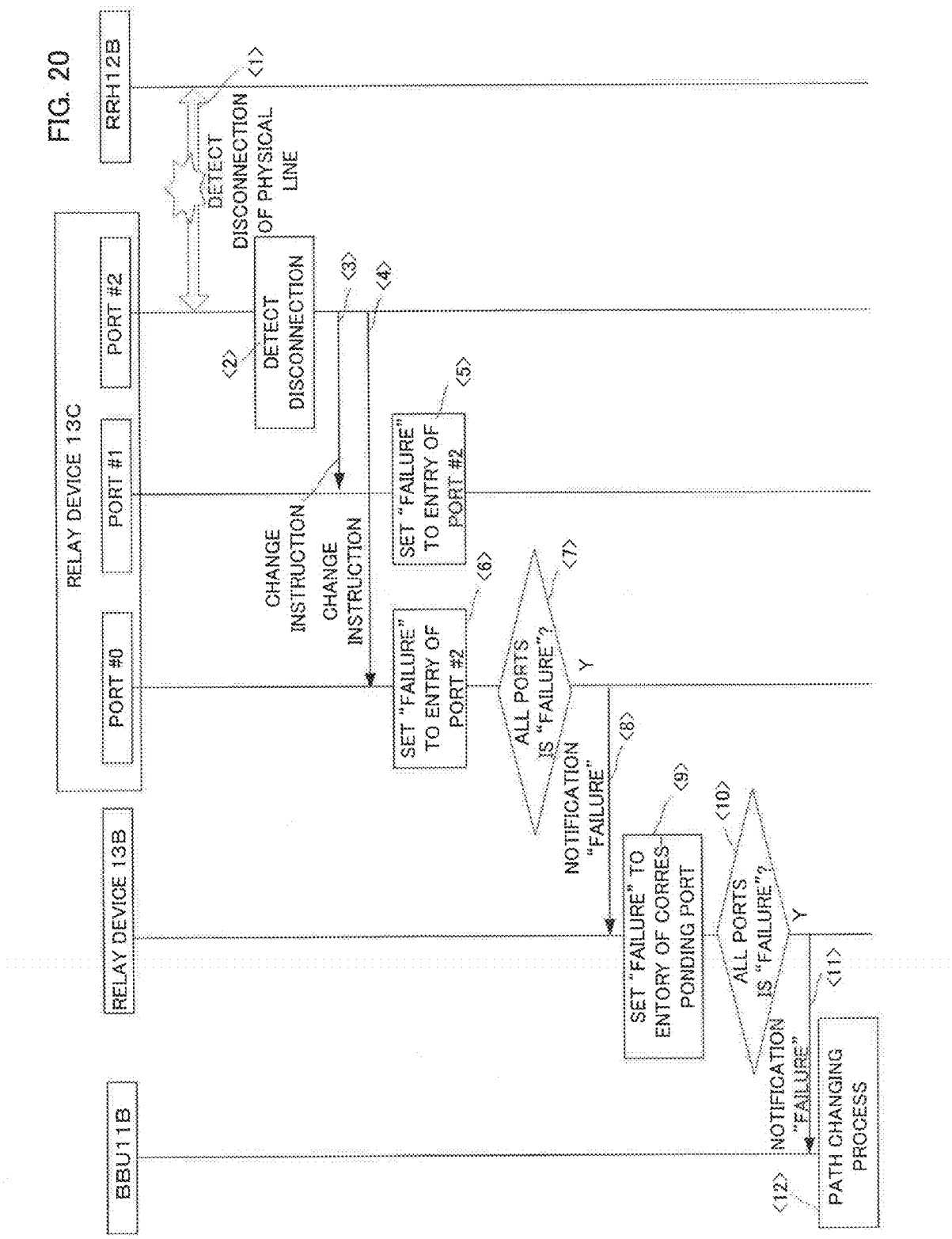
FIG. 20 is a sequence diagram illustrating operation at a failure of a transmission path.

FIG. 20 is a sequence diagram illustrating operation at a failure of a transmission path. When the physical line between the RRH 12B and the port of the relay device 13D (port #2 in the example of FIG. 20) is cut (FIG. 20 <1>), the control unit 138 of the relay device 13D detects the cut of the physical line (FIG. 20 <2>).

In this case, the control unit 138 executes the process of 052 to 054 of FIG. 19 and sets the state of the entry related to the failure to "failed". In the example of FIG. 20, a change instruction of the state for the sorting table 134 related to the ports #1 and #0 is provided to each sorting processing unit 132 (FIG. 20 <3> and <4>), and each sorting processing unit 132 rewrites the state of the entry (FIG. 20 <5> and <6>).

In the sorting table 134 related to the port #0, all entries related to the transmission port number (port #2) become "failed" as a result of rewriting the states of the entries to "failed" (FIG. 20 <7>).

In this case, an error message process is executed, and an error message (failure notification) of a failure notification is transmitted to the relay device 13B (FIG. 20 <8>). In the relay device 13B, the entry is changed to the failed state (FIG. 20 <9>). When all entries corresponding to the destination ID are in the failed state in the relay device 13B (FIG. 20 <10>), a failure notification is provided to the BBU 11B (FIG. 20 <11>). The BBU 11B executes a path changing process (FIG. 20 <12>).

The content of the path changing process is the same as the process described with reference to FIGS. 17 and 18, and the description will not be repeated. As a result of the change in the path, the transmission path of the relay device 13B-the relay device 13D-the RRH 12B (see arrows of broken lines in FIG. 16) is changed to the relay device 13B-the relay device 13C-the RRH 12B that is a bypass path (see arrows of solid lines in FIG. 16).

The difference from the case of detecting an error is that the failure in the transmission path may influence a plurality of transmission ports. Therefore, when a plurality of transmission ports are unusable, the states of the entries of the sorting tables 134 corresponding to the transmission ports are changed to "failed".

<<Change in Combination of BBUs and RRHs>>

Next, a process in changing the combination of the BBU 11 and the RRH 12 will be described. For example, it is assumed that in the operation of FIG. 2, the RRH 12A and the RRH 12B transmit and receive divided frames to and from the BBU 11A through the relay device 13A and the relay device 13C, and the RRH 12C transmits and receives divided frames to and from the BBU 11B through the relay device 13B and the relay device 13D.

When the maintenance server 15 provides each control unit 11 of the BBU 11A and the BBU 11B with an instruction for changing the connection point (subordinate point) of the RRH 12B from the BBU 11A to the BBU 11B, the following process is executed.

More specifically, the control unit 111 of the BBU 11A provides the control unit 125 of the RRH 12B with an instruction for removing the connection between the RRH 12B and the BBU 11A. Consequently, the control unit 125 of the RRH 12B uses the control command "blocked" to set, for the relay device 13C, the states of all entries storing the correspondence between the destination ID as the ID of the BBU 11A and the transmission port number of the transmission port for transmitting the divided frames from the RRH 12B to the relay device 13A to "blocked". Alternatively, the control unit 125 uses the control command "rewrite sorting table" to delete all entries storing the correspondence. As a result, the divided frames transmitted from the RRH 12B to the BBU 11A do not reach the BBU 11A.

Meanwhile, the BBU 11A transmits, to the relay device 13C, the control command "block" for changing all states of the entries storing the correspondence between the destination ID as the ID of the RRH 12B and the transmission port number of the transmission port for transmitting the divided frames to the RRH 12B to "blocked". The relay device 13C changes all states of the entries to "blocked". Alternatively, the control command "rewrite sorting table" may be used to delete all entries storing the correspondence. The control unit of the BBU 11A can further use resources for baseband processing related to the user data transmitted and received to and from the RRH 12B as resources for baseband related to the user data transmitted and received to and from the RRH 12A (change the resource allocation).

Meanwhile, to establish a connection relationship with the RRH 12B, the BBU 11B uses the control command "rewrite sorting table" to transmit, to the relay device 13D, a CPRI signal related to the control command "rewrite sorting table" for adding, to the sorting table 134, the entries including the ID of the RRH 12B as the destination ID and the transmission port number of the transmission port for transmitting the divided frames to the RRH 12B, for example. The relay device 13D adds the entries to the corresponding sorting table 134. As a result, a transmission path of the divided frames from the BBU 11B to the RRH 12B is formed.

The control unit 111 of the BBU 12B further provides the control unit 125 of the RRH 12B with an instruction for forming a transmission path of the divided frames to the BBU 11A. Consequently, the control unit 125 uses the control command "rewrite sorting table" and controls the relay device 13D to add, to a predetermined sorting table 134, entries including the ID (destination ID) of the BBU 11B and the transmission port number of the transmission port for transmitting the divided frames to the relay device 13B. As a result, a transmission path of data from the RRH 12B to the BBU 11B is formed.

The control unit 111 of the BBU 11B and the control unit 125 of the RRH 12B further negotiate for the CPRI link between the BBU 11B and the RRH 12B as a function of a higher-level application and set the CPRI link between the BBU 11B and the RRH 12B. The setting of the CPRI link is an existing technique, and details will not be described. In this way, the base station apparatus 10 can realize the change in the connection relationship between the BBU 11 and the RRH 12 by rewriting the entries for the sorting table 134 (deleting entries and adding entries).

Effects of Embodiment

According to the base station apparatus (base station system) 10 of the embodiment, rewriting the sorting table 134 (adding entries, deleting entries, changing part of registration content of entries) can change the transmission port for transmitting the divided frames. As a result, the BBU 11 as the connection point of the RRH 12 can be changed to another BBU 11 during operation.

Figure 21:
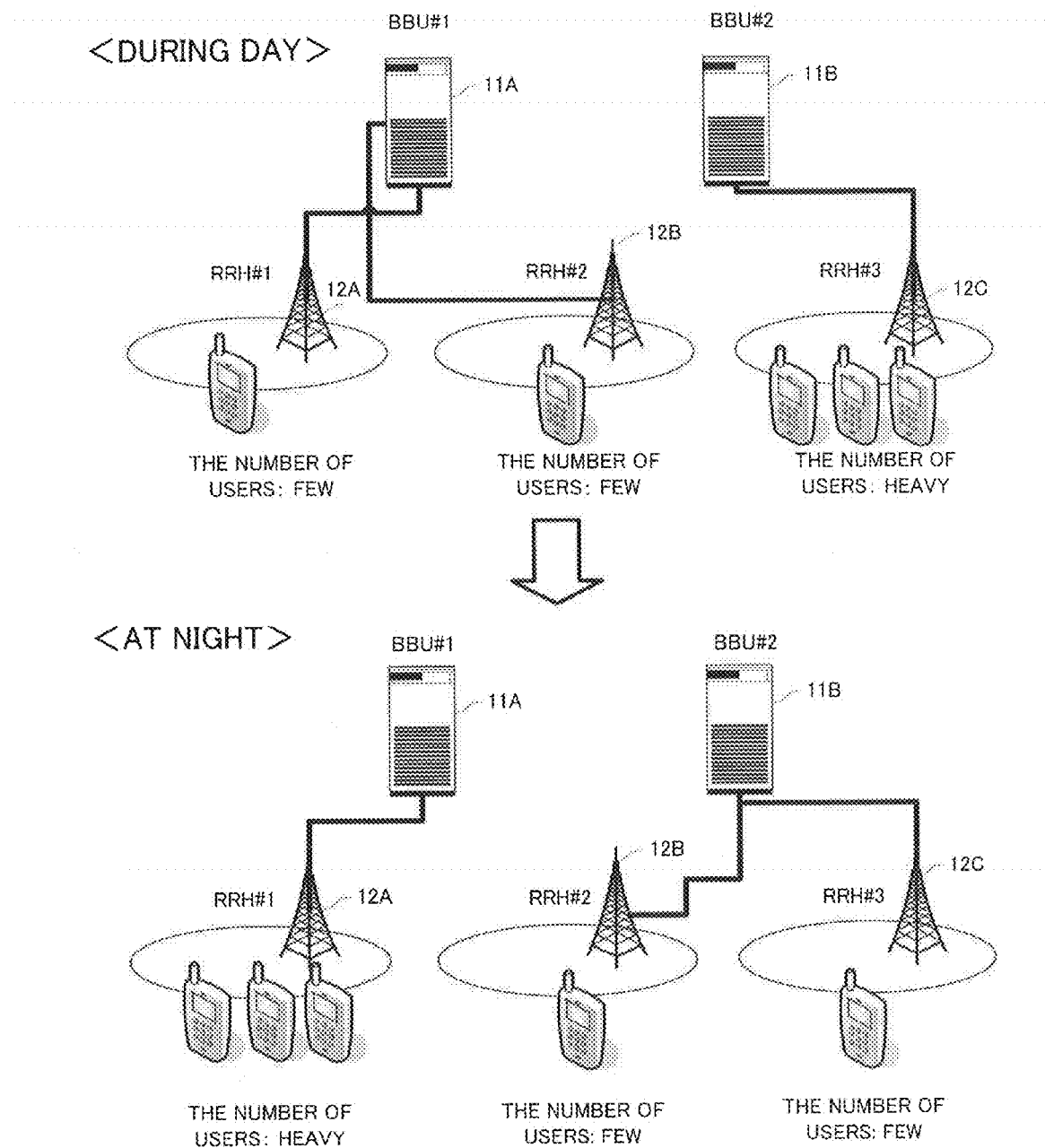
FIG. 21 is an explanatory diagram illustrating an example of operation of the base station apparatus (base station system) according to the embodiment.

For example, in the example illustrated in FIG. 21, the numbers of users (connected mobile terminals) of the RRH 12A and the RRH 12B are small during the day, and the number of mobile terminals connected to the RRH 12C is large. At night, the number of users of the RRH 12A increases, and the numbers of users of the RRH 12B and the RRH 12C decrease. Therefore, the RRH 12A and the RRH 12B are connected to the BBU 11A during the day, and the connection point of the RRH 12B is switched to the BBU 11B at night. For example, a changing process of the BBU 11 connected by the RRH 12B is executed at predetermined time (example: 18 o'clock and 9 o'clock).

As a result, a large number of resources for baseband processing may be sorted to the RRH 12 with the large number of users. When an increase in the user resources for an RRH 12 is suddenly desired due to an event, an accident, a disaster, or the like, the BBU 11 as the connection point can be switched to increase the resources. In this way, according to the embodiment, the resources of a plurality of BBUs 11 can be effectively used.

At a failure of the BBU 11, each RRH 12 under the control of the BBU 11 with the failure can switch the connection point to another BBU to prevent the occurrence of a failure in a communication service or to reduce the extent of the failure. In the example illustrated in FIG. 22, when a BBU 11E stops the operation due to a failure, the mobile terminal is unable to perform communication using an RRH 12D, an RRH 12E, and an RRH 12F under the control of the BBU 11E.

Figure 22:
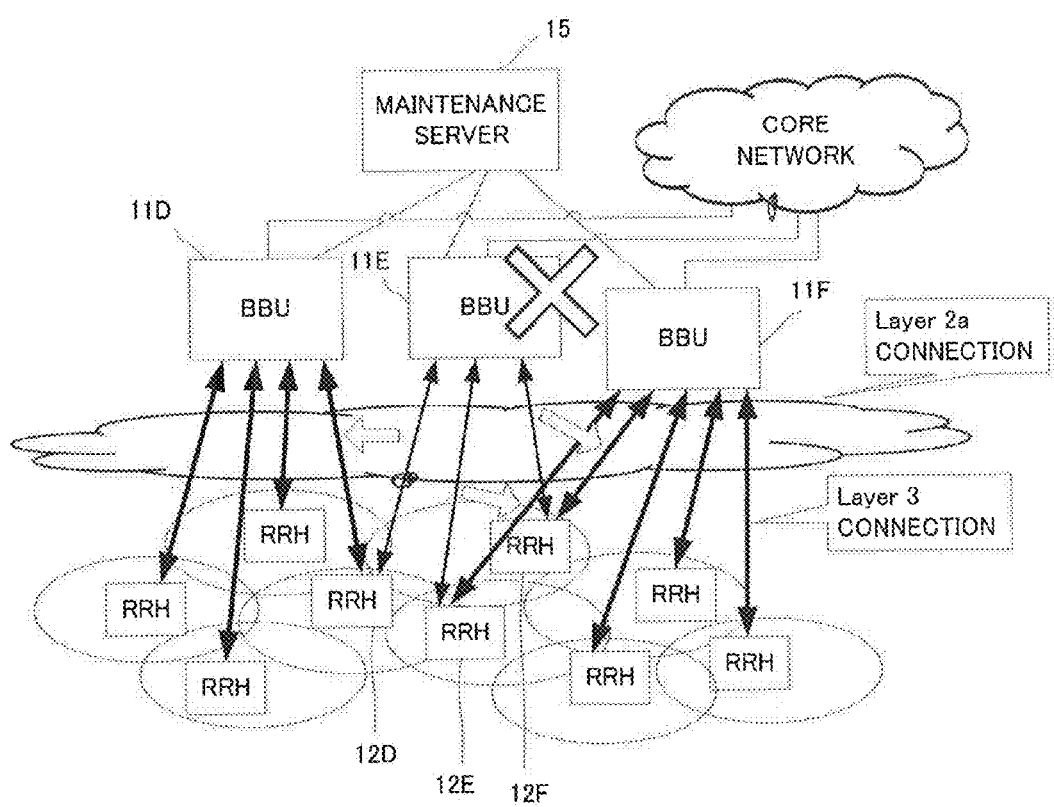
FIG. 22 is an explanatory diagram illustrating an example of operation of the base station apparatus (base station system) according to the embodiment.

The maintenance server 15 monitors the BBU 11E and adjacent BBU 11D and BBU 11F. When a failure of the BBU 11E is detected, the maintenance server 15 instructs the BBU 11D to connect to the RRH 12D and instructs the BBU 11F to connect to the RRH 12E and the RRH 12F. As a result, the BBU 11D can execute a process similar to the operation or process described in the "Change in Combination of BBU and RRH" to bring the RRH 12D under the control. The BBU 11F can also bring the RRH 12E and the RRH 12F under the control. This can prevent or suppress a failure in the service associated with the failure of the BBU 11E. In FIGS. 21 and 22, the illustration of the relay device 13 is omitted.

As described with reference to FIG. 16 and the like, the bypass route (change in the path) can prevent the stop of the service at a failure or an error in the physical line between the BBU and the RRH.

Furthermore, power can be saved by changing the BBU 11 as the connection point of the RRH 12. For example, all of the RRHs 12A, 12B, and 12C can be connected to one of the BBU 11A and the BBU 12B in FIG. 2 to turn off the power of the other. As a result, the number of operating BBUs can be reduced to save the power.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus, comprising:
a plurality of wireless control devices, each of which transmits data blocks addressed to a wireless device connected to the wireless control device itself;
a plurality of wireless devices, each of which transmits data blocks addressed to a wireless control device connected to the wireless device itself; and
one or two or more relay devices arranged between the plurality of wireless control devices and the plurality of wireless devices, each relay device including:
a plurality of transmission ports;
a table to store a correspondence between destinations of received data blocks and transmission ports for transmitting the reception data blocks;
a sorting unit to sort received data blocks to one of the plurality of transmission ports corresponding to destinations of the received data blocks based on the correspondence; and
a controller to control rewriting of the table for changing the correspondence.

2. The base station apparatus according to claim 1, wherein the controller controls rewriting of the table so that a certain wireless device connected to a certain wireless control device is connected to another wireless control device different from the certain wireless control device.

3. The base station apparatus according to claim 1, wherein the controller controls rewriting of the table so that a path of data blocks transmitted and received between a certain wireless control device and a wireless device is changed.

4. The base station apparatus according to claim 1, wherein the table stores a first correspondence indicating a correspondence between a destination of data blocks transmitted from one of a wireless control device and a wireless device to the other and a transmission port for transmitting the data blocks through a first path, and a second correspondence indicating a correspondence between the destination of the data blocks and a transmission port for transmitting the data blocks through a second path, and the sorting unit sorts the data blocks to the transmission port of the first correspondence when both of the transmission port of the first correspondence and the transmission port of the second correspondence is available, and sorts the data blocks to the transmission port of the second correspondence when the transmission port of the first correspondence is not available.

5. The base station apparatus according to claim 1, wherein the plurality of relay devices include a first relay device and a second relay device each of which is positioned on a path for transmitting data blocks transmitted from one of a wireless control device and a wireless device to the other, a controller of the second relay device notifies a controller of the first relay device of an error message when the data blocks addressed to one of the wireless control device and the wireless device received from the first relay device is not transmitted from the transmission port according to the correspondence due to a predetermined error, and the controller of the first relay device sets the correspondence on the table used to transmit the data blocks to an unusable state at reception of the error message, and when there is no other correspondence usable to transmit the data blocks in place of the correspondence set to the unusable state, transmits a new error message to a source counter device of the data blocks.

6. The base station apparatus according to claim 1, wherein the plurality of relay devices include a first relay device and a second relay device each of which is positioned on a path for transmitting data blocks transmitted from one of a wireless control device and a wireless device to the other, a controller of the second relay device sets, to an unusable state, all correspondences used for transmitting the data blocks from a transmission port for transmitting the data blocks when a failure of a physical line connected with the transmission port is detected and notifies a controller of the first relay device of an error message when there is no other correspondence usable for transmitting the data blocks in place of the correspondences set to the unusable state, and the controller of the first relay device sets the correspondence on the table used to transmit the data blocks to an unusable state at reception of the error message, and when there is no other correspondence usable for transmitting the data blocks in place of the correspondences set to the unusable state, transmits a new error message to a source counter device of the data blocks.

7. The base station apparatus according to claim 1, wherein each of the plurality of wireless control devices and the plurality of wireless devices provides a control signal, which is for storing the correspondence between the destination of the data blocks and the transmission port for transmitting the data blocks to the destination in the table, to each of one or two or more relay devices positioned on the transmission path of the data blocks to be transmitted to the wireless control device or the wireless device as a connection partner.

8. The base station apparatus according to claim 1, wherein the data blocks are divided frames obtained by equally dividing wireless frames transmitted and received between the wireless control device and the wireless device, and destination information of the data blocks is stored in a free area of the divided frames.

\* \* \* \* \*